United States Patent
Onodera et al.

(10) Patent No.: US 7,928,337 B2
(45) Date of Patent: Apr. 19, 2011

(54) APPARATUS FOR MACHINING A WORKPIECE USING WIRE DISCHARGE INCLUDING AN UPPER AND LOWER POWER SUPPLY UNIT

(75) Inventors: Yasuo Onodera, Tokyo (JP); Tatsushi Sato, Tokyo (JP); Yoshikazu Ukai, Tokyo (JP); Takashi Hashimoto, Tokyo (JP); Koichiro Hattori, Tokyo (JP); Hisashi Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 886 days.

(21) Appl. No.: 11/883,999

(22) PCT Filed: Oct. 24, 2006

(86) PCT No.: PCT/JP2006/321179
§ 371 (c)(1),
(2), (4) Date: Aug. 9, 2007

(87) PCT Pub. No.: WO2008/050405
PCT Pub. Date: May 2, 2008

(65) Prior Publication Data
US 2010/0133237 A1  Jun. 3, 2010

(51) Int. Cl.
*B23H 7/04* (2006.01)
*B23H 1/02* (2006.01)
(52) U.S. Cl. .................... 219/69.12; 219/69.13
(58) Field of Classification Search ............. 219/69.12, 219/69.13, 69.18; 700/162
See application file for complete search history.

(56) References Cited

U.S. PATENT DOCUMENTS

| 4,652,717 | A | * | 3/1987 | Briffod et al. ............ 219/69.12 |
| 4,691,089 | A | | 9/1987 | Balleys |
| 5,306,889 | A | * | 4/1994 | Kaneko et al. ............ 219/69.12 |
| 5,500,500 | A | * | 3/1996 | Mohri et al. ............ 219/69.13 |
| 2004/0124182 | A1 | * | 7/2004 | Liang et al. ............ 219/69.12 |
| 2005/0115929 | A1 | * | 6/2005 | Sakurai et al. ............ 219/69.13 |

FOREIGN PATENT DOCUMENTS

| JP | 50-22393 A | 3/1975 |
| JP | 59-47123 A | 3/1984 |
| JP | 60-29230 A | 2/1985 |
| JP | 61-95825 A | 5/1986 |
| JP | 61-288930 A | 12/1986 |
| JP | 01-97525 A | 4/1989 |
| JP | 02-30429 A | 1/1990 |
| JP | 06-61663 B2 | 8/1994 |

* cited by examiner

*Primary Examiner* — Geoffrey S Evans
(74) *Attorney, Agent, or Firm* — Sughrue Mion, PLLC

(57) ABSTRACT

A wire-discharge machining apparatus controls a short circuit between a wire electrode and a workpiece and wire-breakage, and makes it easy to improve productivity, by performing power supply control to mix an upper-side power supply state in which a high-frequency pulse voltage is applied from an upper-side power supplying unit, a lower-side power supply state in which the high-frequency pulse voltage is applied from a lower-side power supplying unit, and a both-sides power supply state in which the high-frequency pulse voltage is applied to the wire electrode from both power supplying units in synchronization with each other during a period of electric discharge machining.

12 Claims, 15 Drawing Sheets

APPARATUS FOR MACHINING A WORKPIECE USING WIRE DISCHARGE INCLUDING AN UPPER AND LOWER POWER SUPPLY UNIT

TECHNICAL FIELD

The present invention relates to a wire-discharge machining apparatus that causes an electric discharge between a wire electrode and a workpiece and machines the workpiece into a predetermined shape.

BACKGROUND ART

A wire-discharge machining apparatus applies a high-frequency pulse voltage to a wire electrode and removes the workpiece little by little using an electric discharge caused between the work electrode and the workpiece by the application of the voltage to machine the workpiece into a predetermined shape. The wire electrode travels in a predetermined direction, for example, a vertical direction while being guided by a pair of upper and lower wire guides in the direction. Machining fluid is supplied to an area around the wire electrode while the workpiece is machined. For example, it is possible to accurately machine the workpiece by causing the electric discharge while moving a table having the workpiece placed thereon in the predetermined direction according to numerical control.

In machining the workpiece accurately and stably with the wire electric discharge machining, it is important to machine the workpiece while keeping an interval between the wire electrode and the workpiece within a predetermined range. When the wire electrode and the workpiece are short-circuited, the machining stops because the electric discharge is not caused. Concentration of electric discharges (hereinafter, "concentrated electric discharge") occurs because, for example, machining wastes accumulates between the wire electrode and the workpiece and electric discharge energy excessively increases locally. As a result, breakage of the wire electrode (hereinafter, "wire-breakage") often occurs. When the wire-breakage occurs, since the wire electrode has to be guided by the wire guides again, productivity substantially falls. Thus, various technologies for preventing the wire-breakage have been devised.

For example, a Patent Document 1 discloses an electric discharge machining apparatus in which two or more electricity conducting terminals for supplying a pulse voltage from a machining power supply to a wire electrode are provided above and below a workpiece, electricity conduction switches are provided between the respective electricity conducting terminals and the machining power supply, and the electricity conduction switches are controlled to be changed over every time a plurality of continuous pulse voltages are applied from the machining power supply to one electricity conducting terminal. In this electric discharge machining apparatus, since an electric discharge point between the wire electrode and the workpiece periodically moves up and down, heat generation from the wire electrode is controlled even if a large current is applied. Moreover, since electric discharge points between the wire electrode and the workpiece are dispersed, wire-breakage is prevented.

A Patent Document 2 discloses a wire-cut electric discharge machining apparatus in which electricity conducting elements for supplying a machining pulse to a wire electrode are provided on an upper-side and a lower-side of a workpiece and machining pulse power supplies are provided separately between the upper electricity conducting element and the workpiece and between the lower electricity conducting element and the workpiece, respectively. In this wire-cut electric discharge machining apparatus, pulse electric currents are asynchronously fed to the wire electrode from the upper electricity conducting element and the lower electricity conducting element, respectively, to prevent concentration of electric discharge points and, as a result, prevent wire-breakage.

A Patent Document 3 discloses an electric discharge machining apparatus in which two contacts are provided along a wire electrode to be located at both ends of a machining area in a workpiece and a machining electric current is supplied to one or both of the two contacts depending on an electric discharge position between the wire electrode and the workpiece. In this electric discharge machining apparatus, the contact to which the machining electric current should be supplied is changed depending on the electric discharge position to prevent local heating due to concentrated electric discharge and, as a result, prevent wire-breakage.

Patent Document 1: Japanese Patent Application Laid-Open No. S59-47123
Patent Document 2: Japanese Patent Application Laid-Open No. H1-97525
Patent Document 3: Japanese Patent Publication No. H6-61663

DISCLOSURE OF INVENTION

Problem to be Solved by the Invention

All of the electric discharge machining apparatuses described in the Patent Documents 1 to 3 are useful in preventing the wire-breakage and improve productivity. However, to improve productivity in wire electric discharge machining, it is desired to prevent the wire-breakage and prevent a short circuit between the wire electrode and the workpiece. According to the experiments of the inventors of the present invention, a short circuit may be caused simply by applying a voltage of several pulses to the wire electrode via one of the electricity conducting terminal arranged above the workpiece and the electricity conducting terminal arranged below the workpiece.

Therefore, it is impossible to efficiently control the short circuit simply by alternately performing power supply from one power supply terminal to the wire electrode and power supply from the other power supply terminal to the wire electrode as in the electric discharge machining apparatus described in the Patent Document 1. The same holds true when power supply from one power supply terminal to the wire electrode and power supply from the other power supply terminal to the wire electrode are performed asynchronously as in the wire-cut electric discharge machining apparatus described in the Patent Document 2 and when power supply from one power supply terminal to the wire electrode and power supply from the other power supply terminal to the wire electrode are changed depending on an electric discharge position as in the electric discharge machining apparatus described in the Patent Document 3. It is also impossible to efficiently control the short circuit in these power supply forms. When the wire electrode and the workpiece are short-circuited, since an electric discharge is not generated, electric discharge machining itself is not performed smoothly and average machining speed falls.

The present invention has been devised in view of the circumstances and it is an object of the present invention to obtain a wire-discharge machining apparatus that controls a short circuit between a wire electrode and a workpiece and wire-breakage to easily improve productivity.

Means for Solving Problem

To achieve the above object, a wire-discharge machining apparatus according to one aspect of the present invention applies, while supplying machining fluid to a space between a wire electrode traveling in a board thickness direction of a workpiece and the workpiece, a high-frequency pulse voltage to the wire electrode via a pair of power supplying units arranged above and below the workpiece and machines the workpiece with an electric discharge caused between the wire electrode and the workpiece. The wire-discharge machining apparatus includes a main power supply that applies the high-frequency pulse voltage to an upper-side power supplying unit of the pair of power supplying units arranged on an upper-side of the workpiece via a first switching element unit and applies the high-frequency pulse voltage to a lower-side power supplying unit arranged on a lower-side of the workpiece via a second switching element unit; a first pulse oscillator that supplies a pulse signal for controlling opening and closing operations of the first switching element unit to the first switching element unit; a second pulse oscillator that supplies a pulse signal for controlling opening and closing operations of the second switching element unit to the second switching element unit; a storing unit having stored therein power supply control data for defining the opening and closing operations of each of the first switching element unit and the second switching element unit and performing power supply control to mix an upper-side power supply state in which the high-frequency pulse voltage is applied to the wire electrode only from the upper-side power supplying unit, a lower-side power supply state in which the high-frequency pulse voltage is applied to the wire electrode only from the lower-side power supplying unit, and a both-sides power supply state in which the high-frequency pulse voltage is applied to the wire electrode from both the upper-side power supplying unit and the lower-side power supplying unit in synchronization with each other; and a pulse-oscillation control unit that controls operations of each of the first pulse oscillator and the second pulse oscillator based on the power supply control data.

Effect of the Invention

A short circuit between the wire electrode and the workpiece tends to occur in the upper-side power supply state and the lower-side power supply state. However, when the upper-side power supply state and the lower-side power supply state are caused to alternately appear, a position of an electric discharge point between the wire electrode and the workpiece changes in the board thickness direction (the thickness direction) of the workpiece. Thus, it is possible to control generation of concentrated electric discharge and prevent wire-breakage. Since an electric discharge between the wire electrode and the workpiece stabilizes in the both-sides power supply state, it is possible to prevent a short circuit between the wire electrode and the workpiece.

In the wire-discharge machining apparatus according to the present invention, the pulse-oscillation control unit controls operations of each of the first pulse oscillator and the second pulse oscillator based on the power supply control data. Thus, it is possible to mix the upper-side power supply state, the lower supply power supply state, and the both-sides power supply state in an arbitrary pattern during a period of electric discharge machining. It is possible to control a short circuit between the wire electrode and the workpiece and wire-breakage by obtaining appropriate power supply control data corresponding to planned electric discharge machining conditions and the like through, for example, experiments and storing the power supply control data in the storing unit. Therefore, it is also easy to improve productivity.

EXPLANATIONS OF LETTERS OR NUMERALS

Figure 1:
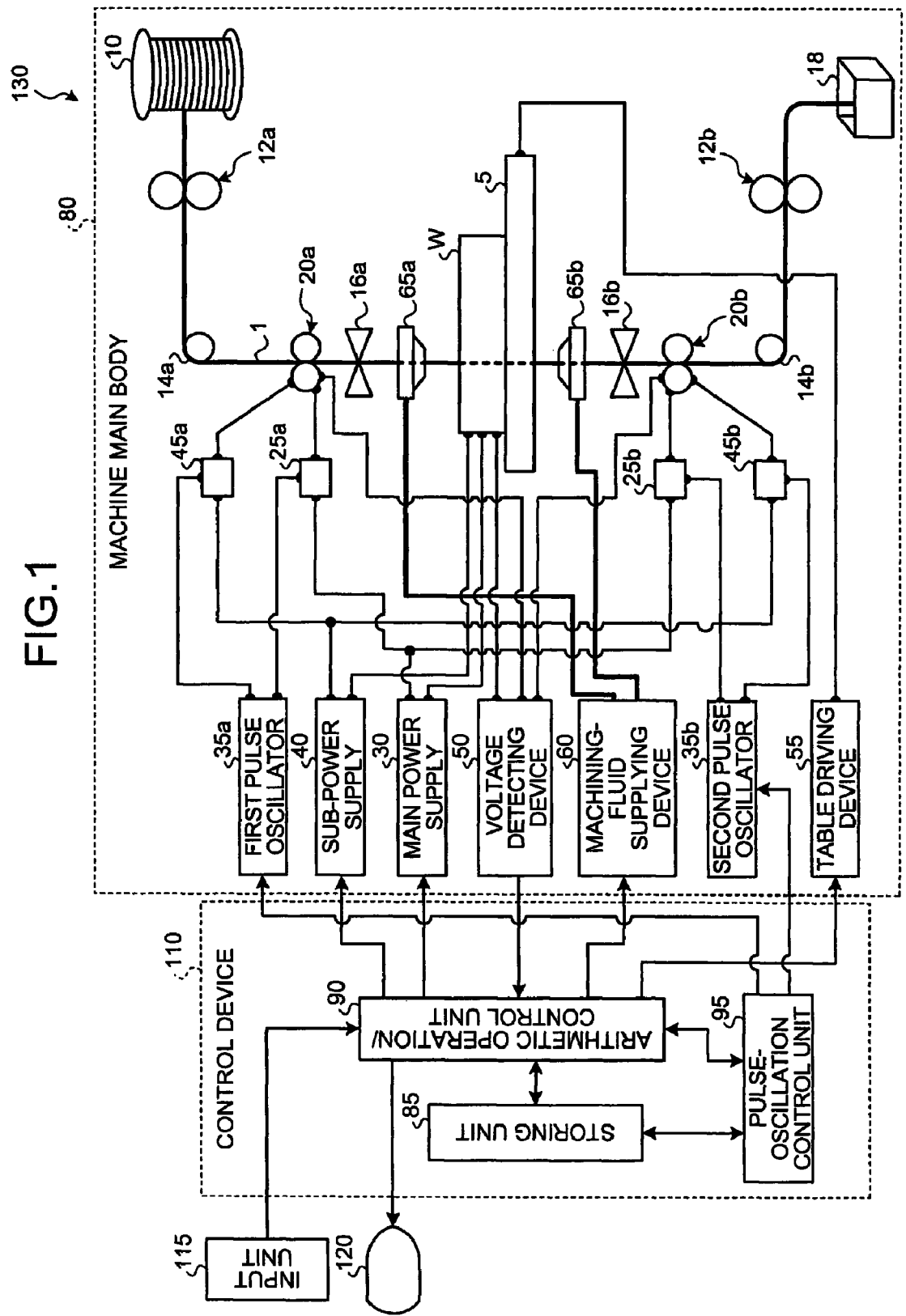
FIG. 1 is a schematic diagram of an example of a wire-discharge machining apparatus according to the present invention.

1 Wire electrode
20a Upper-side power supplying unit
20b Lower-side power supplying unit
25a, 28a First switching element units
25b, 28b Second switching element units
30 Main power supply
30a First main power supply
30b Second main power supply
35a First pulse oscillator
35b Second pulse oscillator
50 Voltage detecting device
55 Table driving device
57 Speed measuring device
60 Machining-fluid supplying device
65a Upper-side nozzle
65b Lower-side nozzle
70 Impedance measuring unit
75 Wire-breakage-sign detecting unit
80, 80A to 80D Machine main bodies
85 Storing unit
90, 90a to 90f Arithmetic operation/control units
95, 95a to 95f Pulse-oscillation control units
100 Board-thickness determining unit
105 Flow-rate comparing unit
110, 110A to 110J Control devices
130, 140, 150, 160, 170, 180, 190 Wire-discharge machining apparatuses
200, 210, 220, 230, 240 Wire-discharge machining apparatuses
W Workpiece

BEST MODE(S) FOR CARRYING OUT THE INVENTION

Exemplary embodiments of a wire-discharge machining apparatus according to the present invention are explained in detail below with reference to the drawings. The present invention is not limited to the embodiments explained below.

First Embodiment

FIG. 1 is a schematic diagram of an example of a wire-discharge machining apparatus according to the present invention. A wire-discharge machining apparatus 130 shown in the figure includes a machine main body 80 that electric-discharge machines a workpiece W into a predetermined shape under numerical control, a control device 110 that numerically controls operations of the machine main body 80, an input unit 115 that is connected to the control device 110 by wire or by radio and inputs a command, data, and the like to the control device 110, and a display unit 120 that displays the command, the data, and the like inputted to the control device 110, an operation state of the machine main body 80, or the like.

The machine main body 80 applies a high-frequency pulse voltage to a wire electrode 1 traveling in a board thickness direction of the workpiece W and machines the workpiece W with an electric discharge generated between the wire electrode 1 and the workpiece W. The workpiece W is placed on a table 5 that is movable on an X-Y plane (a horizontal plane). The wire electrode 1 travels to traverse the workpiece W in the board thickness direction thereof in a state in which tension is applied to the wire electrode 1.

To cause the wire electrode 1 to travel in the predetermined direction, a wire bobbin 10, tension rollers 12a, a guide roller 14a, and a wire guide 16a are arranged above the table 5 and a wire guide 16b, a guide roller 14b, and tension rollers 12b are arranged below the table 5. The wire electrode 1 wound around the wire bobbin 10 is drawn out by the tension rollers 12a, guided in the vertical direction by the guide roller 14a, the wire guide 16a, the wire guide 16b, and the guide roller 14b, and, then, drawn by the tension rollers 12b and collected in a wire collection box 18. Speed of drawing of the wire electrode 1 by the tension rollers 12b is set higher than speed of drawing out of the wire electrode 1 by the tension rollers 12. As a result, the wire electrode 1 travels to traverse the workpiece W in the board thickness direction thereof in a state in which tension is applied to the wire electrode 1.

To apply a high-frequency pulse voltage to the wire electrode 1, a pair of power supplying units 20a and 20b are arranged separately above and below the table 5. The power supplying unit 20a arranged above the table 5 (hereinafter, "upper-side power supplying unit 20a") is located above the wire guide 16a and the power supplying unit 20b arranged below the table 5 (hereinafter, "lower-side power supplying unit 20b") is located below the wire guide 16b. A first switching element unit 25a having at least one switching element is connected to the upper-side power supplying unit 20a. A main power supply 30 and a first pulse oscillator 35a are connected to the first switching element unit 25a. A second switching element unit 25b having at least one switching element is connected to the lower-side power supplying unit 20b. The main power supply 30 and a second pulse oscillator 35b are connected to the second switching element unit 25b. The main power supply 30 is also connected to the center in the board thickness direction in the workpiece W.

The main power supply 30 supplies a voltage of a predetermined level to each of the first switching element unit 25a and the second switching element unit 25b during operation thereof. The first pulse oscillator 35a and the second pulse oscillator 35b supply pulse signals for controlling opening and closing operations of the first and the second switching element units 25a and 25b to the first and the second switching element units 25a and 25b. Operations of each of the first pulse oscillator 35a and the second pulse oscillator 35b are controlled by a pulse-oscillation control unit 95 described later to open and close the switching element units 25a and 25b in a predetermined pattern. This makes it possible to apply the high-frequency pulse voltage to the wire electrode 1 from the upper-side power supplying unit 20a or the lower-side power supplying unit 20b or from both the upper-side power supplying unit 20a and the lower-side power supplying unit 20b.

In starting or resuming electric discharge machining of the workpiece W, first, to detect, for example, whether a gap between the wire electrode 1 and the workpiece W is within a predetermined width, a relatively low pulse voltage is supplied from a sub power supply 40 to the upper-side power supplying unit 20a via a third switching element unit 45a and to the lower-side power supplying unit 20b via a fourth switching element unit 45b. At this point, the third switching element unit 45a and the fourth switching element unit 45b are closed in synchronization with each other. A potential difference between the respective power supplying units 20a and 20b and the workpiece W is detected by a voltage detecting device 50. The main power supply 30 operates only when a result of the detection is within a predetermined range. On the other hand, when a result of the detection is not within the predetermined range, the table 5 is moved to adjust the width of the gap between the workpiece W and the wire electrode 1. To move the table 5, a table driving device 55 is connected to the table 5. The table driving device 55 moves the table 5 in a predetermined direction even while the workpiece W is electric-discharge machined. The table 5 includes a speed sensor (not shown) such as a linear encoder or a rotary encoder. A speed measuring device (not shown) measures driving speed of the table 5 based on a detection result of the speed sensor and conveys a result of the measurement to an arithmetic operation/control unit 90 described later.

To control heating of the wire electrode 1 during the electric discharge machining of the workpiece W and prevent wire-breakage of the wire electrode 1, machining fluid is supplied from a machining-fluid supplying device 60 to a space between the workpiece W and the wire electrode 1 via an upper-side nozzle 65a and a lower-side nozzle 65b during the electric discharge machining of the workpiece W. The upper-side nozzle 65a is arranged above the workpiece W and the lower-side nozzle 65b is arranged below the workpiece W. The machining-fluid supplying device 60 has a flow rate measuring function of separately measuring a supply quantity (a flow rate) of the machining fluid to the upper-side nozzle 65a and a supply quantity (a flow rate) of the machining fluid to the lower-side nozzle 65b.

On the other hand, the control device 110 that controls operations of the machine main body 80 includes a storing unit 85, the arithmetic operation/control unit 90, and the pulse-oscillation control unit 95.

Numerical control data used for control of operations of the table driving device 55, the machining-fluid supplying device 60, and the like is stored in the storing unit 85. Power supply control data for defining opening and closing operations of the first switching element unit 25a and the second switching element unit 25b and controlling a form of power supply to the wire electrode 1 is also stored in the storing unit 85. This power supply control data is set to prevent a short circuit between the wire electrode 1 and the workpiece W and wire-breakage under standard electric discharge machining conditions. The power supply control data includes data for opening and closing the first switching element unit 25a while keeping the second switching element unit 25b closed, data for opening and closing the second switching element unit 25b while keeping the first switching element unit 25a opened, and data for opening and closing the first switching element unit 25a and the second switching element unit 25b in synchronization with each other.

The power supply control data stored in the storing unit 85 may be only one kind of power supply control data or, when it is expected or planned that plural kinds of products are manufactured by the wire-discharge machining apparatus 130, may be plural kinds of power supply control data associated with the products, respectively.

The arithmetic operation/control unit 90 starts the sub power supply 40 first when a command instructing start of operation of the wire-discharge machining apparatus 130 is inputted from the input unit 115 described later. Then, the arithmetic operation/control unit 90 judges whether a detection result of the voltage detecting device 50 is within the predetermined range. When the detection result is within the predetermined range, the arithmetic operation/control unit 90 starts the main power supply 30. Thereafter, the arithmetic operation/control unit 90 controls operations of the table driving device 55, the machining-fluid supplying device 60, and the like based on the numerical control data stored in the storing unit 85. During the electric discharge machining of the workpiece W, the operation of the table driving device 55 is controlled based on the numerical control data and the table 5 moves in the predetermined direction. The machining fluid of a predetermined flow rate is supplied from the machining-fluid supplying device 60 to the nozzles 65a and 65b, respectively, based on the numerical control data.

The arithmetic operation/control unit 90 calculates, based on the detection result of the potential difference by the voltage detecting device 50, energy of a high-frequency pulse voltage applied to the workpiece W from the wire electrode 1. The arithmetic operation/control unit 90 also calculates machining speed based on the driving speed of the table 5 measured by the speed measuring device. The arithmetic operation/control unit 90 sequentially calculates the board thickness of the workpiece from the energy of the high-frequency pulse voltage, the machining speed, and the like, reads out control data corresponding to the board thickness from the numerical control data, and feedback-controls the energy of the high-frequency pulse voltage applied to the wire electrode 1. Specifically, the arithmetic operation/control unit 90 feedback-controls a pulse interval of the high-frequency pulse voltage applied. Moreover, the arithmetic operation/control unit 90 controls operations of the display unit 120 to display a command, data, and the like inputted to the control device 110, an operation state of the machine main body 80, or the like on the display unit 120.

The pulse-oscillation control unit 95 starts an operation under the control by the arithmetic operation/control unit 90, reads out predetermined power supply control data stored in the storing unit 85, and controls operations of each of the first pulse oscillator 35a and the second pulse oscillator 35b based on the power supply control data. When plural kinds of power supply control data are stored in the storing unit 85, a user designates desired power supply control data using the input unit 115 prior to electric discharge machining of the workpiece W. At this point, the power supply control data stored in the storing unit 85 is displayed on the display unit 120 to make it easy for the user to select the desired power supply control data.

The power supply control data read out by the pulse-oscillation control unit 95 includes, as described above, the data for opening and closing the first switching element unit 25a while keeping the second switching element unit 25b opened, the data for opening and closing the second switching element unit 25b while keeping the first switching element unit 25a opened, and the data for opening and closing the first switching element unit 25a and the second switching element unit 25b in synchronization with each other. Therefore, during a period in which the workpiece W is electric-discharge machined, an upper-side power supply state in which a high-frequency pulse voltage is applied to the wire electrode 1 from only the upper-side power supplying unit 20a, a lower-side power supply state in which a high-frequency pulse voltage is applied to the wire electrode 1 from only the lower-side power supplying unit 20b, and a both-sides power supply state in which a high-frequency pulse voltage is applied to the wire electrode 1 from both the upper-side power supplying unit 20a and the lower-side power supplying unit 20b are mixed in a predetermined pattern.

Figure 2:
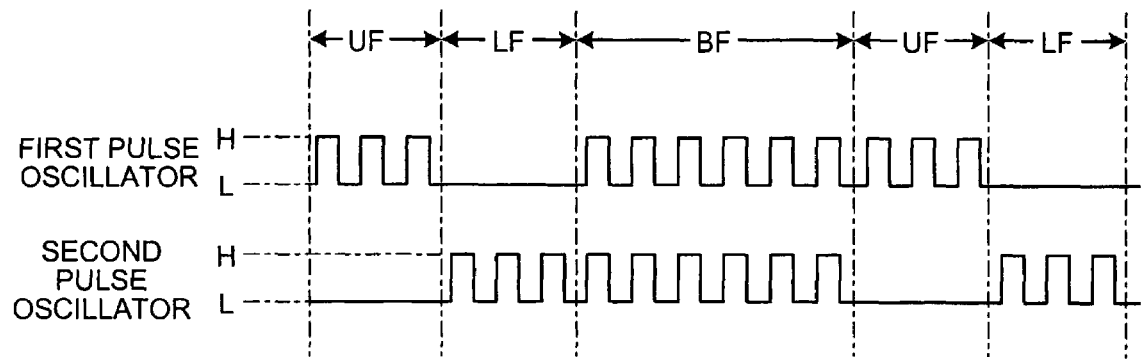
FIG. 2 is a schematic diagram for explaining a relation between waveforms of pulse signals supplied from respective pulse oscillators shown in FIG. 1 to a first switching element unit or a second switching element unit and a state of power supply to a wire electrode.

FIG. 2 is a schematic diagram for explaining a relation between waveforms of pulse signals supplied from the respective pulse oscillators 35a and 35b to the first switching element unit 25a or the second switching element unit 25b and a state of power supply to the wire electrode 1.

As shown in the figure, when a pulse signal supplied from the first pulse oscillator 35a to the first switching element unit 25a has a pulse waveform that repeats a low level L and a high level H at a predetermined period and a pulse signal supplied from the second pulse oscillator 35b to the second switching element unit 25b keeps the low level L, the first switching element unit 25a are opened and closed while the second switching element unit 25b is kept opened. As a result, the power supply state is an upper-side power supply state UF. Conversely, when the pulse signal supplied from the first pulse oscillator 35a to the first switching element unit 25a keeps the low level L and the pulse signal supplied from the second pulse oscillator 35b to the second switching element unit 25b has a pulse waveform that repeats the low level L and the high level H at a predetermined period, the second switching element unit 25b is opened and closed while the first switching element unit 25a is kept opened. Thus, the power supply state is a lower-side power supply state LF. When the pulse signal supplied from the first pulse oscillator 35a to the first switching element unit 25a and the pulse signal supplied from the second pulse oscillator 35b to the second switching element unit 25b have pulse waveforms synchronizing with each other, the first switching element unit 25a and the second switching element unit 25b are opened and closed in synchronization with each other. Thus, the power supply state is a both-sides power supply state BF.

The inventors of the present invention have clarified through experiments that, although frequency of occurrence of a short circuit between the wire electrode 1 and the workpiece W and difficulty in occurrence of wire-breakage fluctuate according to machining conditions such as a material and a line diameter of the wire electrode 1, a quality of machining fluid in use and a supply quantity of the machining fluid from the respective nozzles 65a and 65b, and a material of the workpiece W and a shape of a product manufactured from the workpiece W, a short circuit occurs frequently and machining speed tends not to increase when the power supply states are switched at a short period. The inventors have also clarified through experiments that wire-breakage tends to occur when a number of pulses is excessively increased under the respective power supply conditions.

For example, a sum of a number of pulses of the high-frequency pulse voltage applied to the wire electrode 1 under the upper-side power supply state and a number of pulses of the high-frequency pulse voltage applied to the wire electrode 1 under the lower-side power supply state is set to a number same as a number of pulses of the high-frequency pulse voltage applied to the wire electrode 1 under the both-sides power supply state. In this case, when the numbers of pulses under the respective power supply states are set to be equal to or smaller than 3, it is likely that a short circuit between the wire electrode 1 and the workpiece W frequently occurs and machining speed falls by a great degree. When the numbers of pulses under the respective power supply states are set to be equal to or larger than 10000, it is likely that positions of electric discharge points between the work electrode 1 and the workpiece W are not dispersed much in the board width direction and wire-breakage tends to occur.

Moreover, the inventors of the present invention have clarified through experiments that, when a ratio of a number of pulses under the both-sides power supply state to a total number of pulses applied to the wire electrode 1 is too small, frequency of occurrence of a short circuit between the wire electrode 1 and the workpiece W rises and, when the ratio is too large, wire-breakage tends to occur. For example, it is likely that a short circuit tends to occur when the ratio is smaller than 50% and wire-breakage tends to occur when the ratio is equal to or larger than 95%.

Taking the above into account, it is seen that it is possible to control a short circuit between the wire electrode 1 and the workpiece W and wire-breakage by appropriately mixing the upper-side power supply state, the lower-side power supply state, and the both-sides power supply state.

In the wire-discharge machining apparatus 130, the pulse-oscillation control unit 95 controls the operations of each of the first pulse oscillator 35a and the second pulse oscillators 35b based on the power supply control data stored in the storing unit 85. As a result, power supply control is performed to mix the upper-side power supply state, the lower-side power supply state, and the both-sides power supply state in the predetermined pattern. Therefore, it is possible to control a short circuit between the wire electrode 1 and the workpiece W and wire-breakage by calculating appropriate power supply control data through experiments and storing the power supply control data in the storing unit 85 in advance. Therefore, in the wire-discharge machining apparatus 130, it is easy to improve productivity.

Second Embodiment

In the wire-discharge machining apparatus according to the present invention, to control heating of the wire electrode in the center in the board thickness direction of the workpiece, it is possible to divide the main power supply into two power supplies, a first main power supply and a second main power supply.

Figure 3:
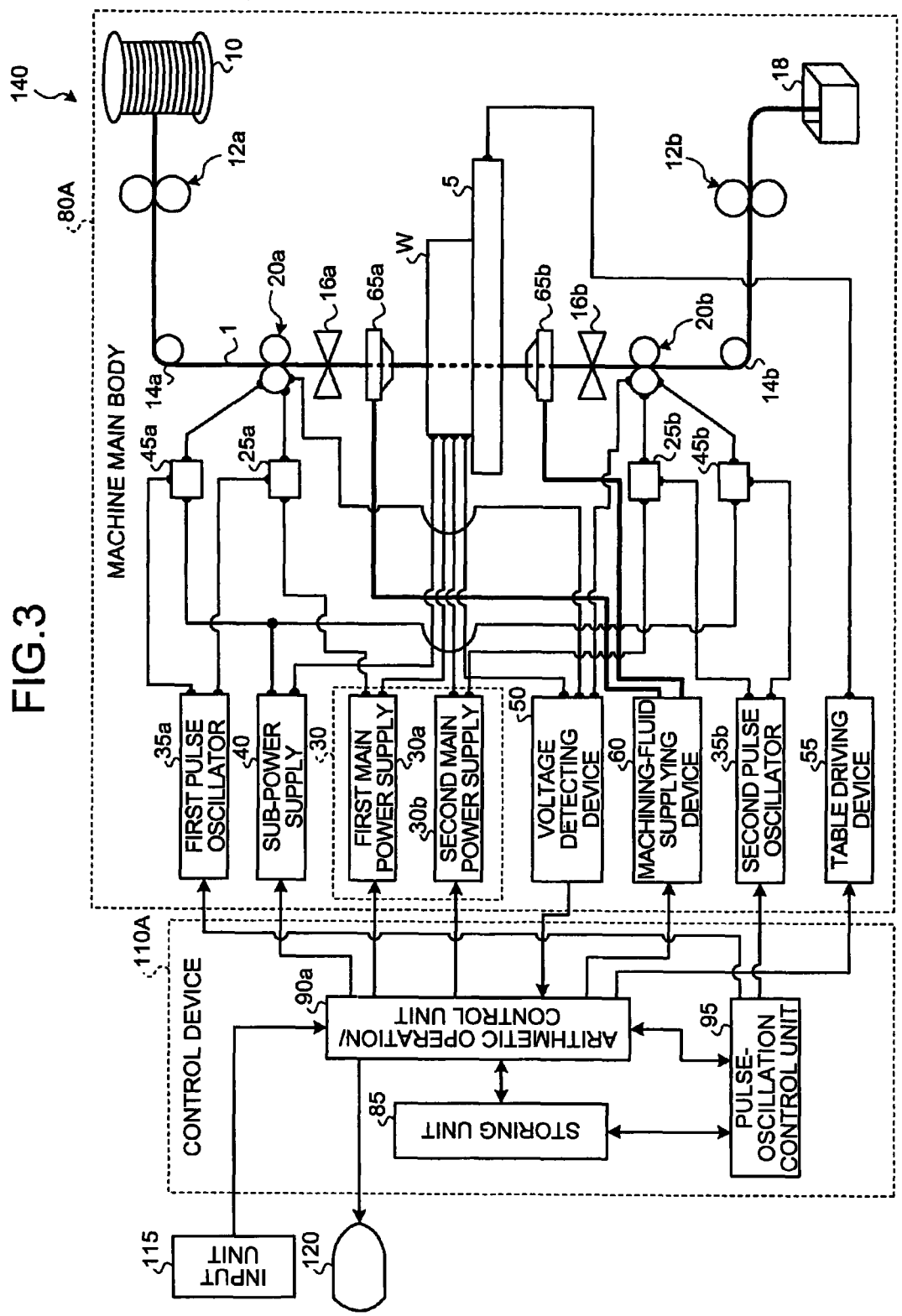
FIG. 3 is a schematic diagram of an example of a wire-discharge machining apparatus according to the present invention in which a main power supply has a first main power supply and a second main power supply.

FIG. 3 is a schematic diagram of an example of a wire electric discharge machining apparatus in which the main power supply has the first power supply and the second power supply. In a wire-discharge machining apparatus 140 shown in the figure, the main power supply 30 has a first main power supply 30a and a second main power supply 30b. The first main power supply 30a is connected to the upper-side power supplying unit 20a via the first switching element unit 25a and is also connected to an upper part in the board thickness direction in the workpiece W. The second main power supply 30b is connected to the lower-side power supplying unit 20b via the second switching element unit 25b and is connected to a lower part in the board thickness direction in the workpiece W. Operations of the first main power supply 30a and the second main power supply 30b are controlled by an arithmetic operation/control unit 90a.

Components other than the above in the wire-discharge machining apparatus 140 are the same as the components in the wire-discharge machining apparatus 130 shown in FIG. 1. Thus, components shown in FIG. 3 same as the components shown in FIG. 1 are denoted by reference numerals and signs same as the reference numerals and signs used in FIG. 3 and explanations of the components are omitted. A machine main body constituting the wire-discharge machining apparatus 140 is denoted by new reference sign 80A and a control device is denoted by new reference sign 110A.

In the wire-discharge machining apparatus 140 constituted in this way, the first main power supply 30a is connected to the upper part in the board thickness direction in the workpiece W and the second main power supply 30b is connected to the lower part in the board thickness direction in the workpiece W. Thus, impedance from the first main power supply 30a to an electric discharge point and impedance from the second main power supply 30b to the electric discharge point in the both-sides power supply state increase as a position of the electric discharge point is closer to the center in the board thickness direction of the workpiece W. As a result, a discharge current value between the wire electrode 1 and the workpiece W is smaller as the position of the electric discharge point is closer to the center in the board thickness direction of the workpiece W.

Figure 4:
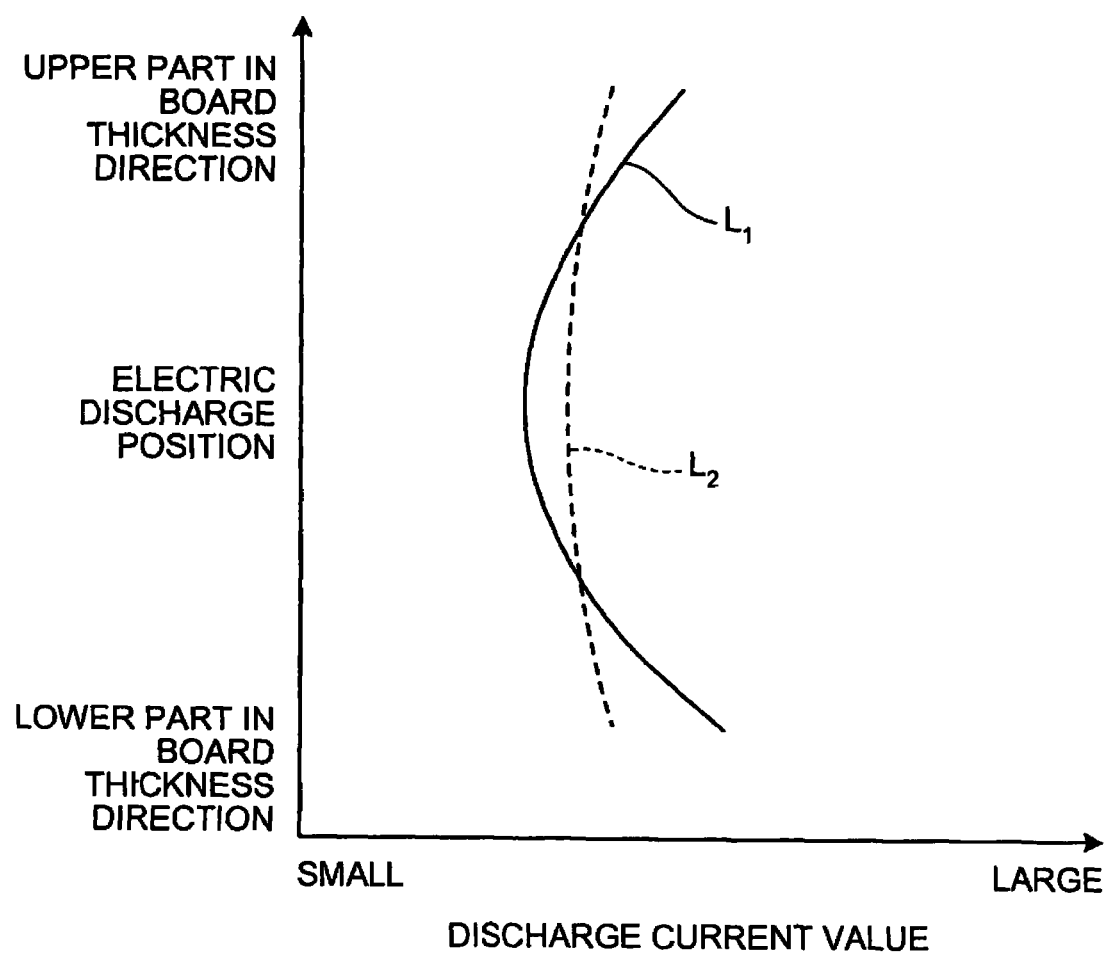
FIG. 4 is a schematic graph for explaining a relation between an electric discharge position and a discharge current value at the time when the wire-discharge machining apparatus shown in FIG. 3 is set in a both-sides power supply state.

FIG. 4 is a schematic graph for explaining a relation between an electric discharge position (a position of an electric discharge point) and a discharge current value at the time when the wire-discharge machining apparatus 140 is set in the both-sides power supply state. A solid line $L_1$ in the figure indicates the relation. For reference, the relation in the wire-discharge machining apparatus 130 shown in FIG. 1 is indicated by a broken line $L_2$ in FIG. 4. A discharge current value indicated by the solid line $L_1$ and a discharge current value indicated by the broken line $L_2$ are obtained under identical machining conditions.

As it is evident from FIG. 4, in both the wire-discharge machining apparatuses 130 and 140, the discharge current value between the wire electrode and the workpiece is smaller as the position of the discharge point is closer to the center in the board thickness direction of the workpiece. However, a degree of the decrease in the discharge current value is larger in the wire-discharge machining apparatus 140 than in the wire-discharge machining apparatus 130. The discharge current value itself in the center in the board thickness direction of the workpiece is smaller in the wire-discharge machining apparatus 140 than in the wire-discharge machining apparatus 130 under the identical machining conditions.

In general, in a wire-discharge machining apparatus, heating of a wire electrode during electric discharge machining is controlled by supplying machining fluid to a space between the wire electrode and a workpiece. However, in the center in a board thickness direction of the workpiece, cooling by the machining fluid is less easily performed compared with an upper part in the board thickness direction and a lower part in the board thickness direction of the workpiece. Therefore, it often occurs that the wire electrode is overheated in the center in the board thickness direction of the workpiece to cause wire-breakage.

However, in the wire-discharge machining apparatus 140 shown in FIG. 3, the discharge current value in the both-sides power supply state is smaller in a position closer to the center in the board thickness direction of the workpiece W. Thus, it is easy to control overheating of the wire electrode 1 even in the center in the board thickness direction of the workpiece W. Therefore, compared with the wire-discharge machining apparatus 130 (see FIG. 1) explained in the first embodiment, it is easy to prevent wire-breakage.

Therefore, according to the wire-discharge machining apparatus 140, it is possible to prevent a short circuit between the wire electrode 1 and the workpiece W by mixing the upper-side power supply state, the lower-side power supply state, and the both-sides power supply state in the predetermined pattern as in the wire-discharge machining apparatus 130. Further, it is easy to control wire-breakage compared with the wire-discharge machining apparatus 130. As a result, it is easy to improve productivity compared with the wire-discharge machining apparatus 130.

Third Embodiment

In the wire-discharge machining apparatus, when a Z axis height (a relative height of the upper-side power supplying unit) or a board thickness of the workpiece changes, distances from an electric discharge point to the respective power supplying units change. According to the change in the distances, deviation occurs in impedances of a power supplying circuit reaching the electric discharge point through the upper-side power supplying unit (hereinafter, "upper-side power supplying circuit") and a power supplying circuit reaching the electric discharge point through the lower-side power supplying unit (hereinafter, "lower-side power supplying circuit"). Such deviation in the impedances causes a difference in magnitudes between discharge currents in the respective power supplying circuits. In a power supplying circuit having a large discharge current (a power supplying circuit having small impedance), wire-breakage tends to occur.

In the wire-discharge machining apparatus according to the present invention, it is possible to adjust conditions for supplying a high-frequency pulse voltage to the upper-side power supplying circuit and the lower-side power supplying circuit according to the deviation of impedances between the upper-side power supplying circuit and the lower-side power supplying circuit to prevent wire-breakage due to the deviation of impedances between the power supplying circuits.

Figure 5:
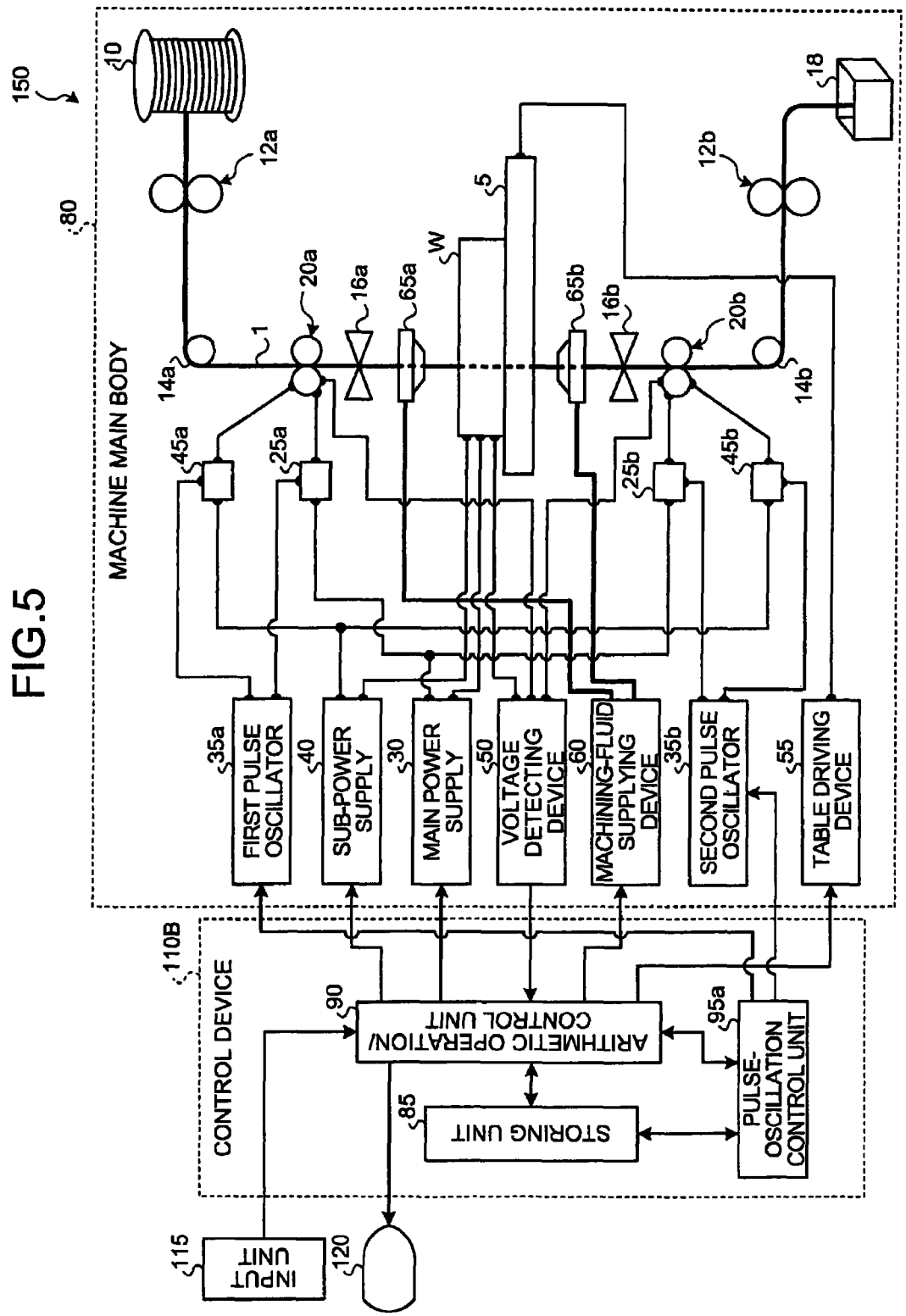
FIG. 5 is a schematic diagram of an example of a wire-discharge machining apparatus according to the present invention that can prevent wire-breakage due to deviation of impedances between power supplying circuits.
Figure 6:
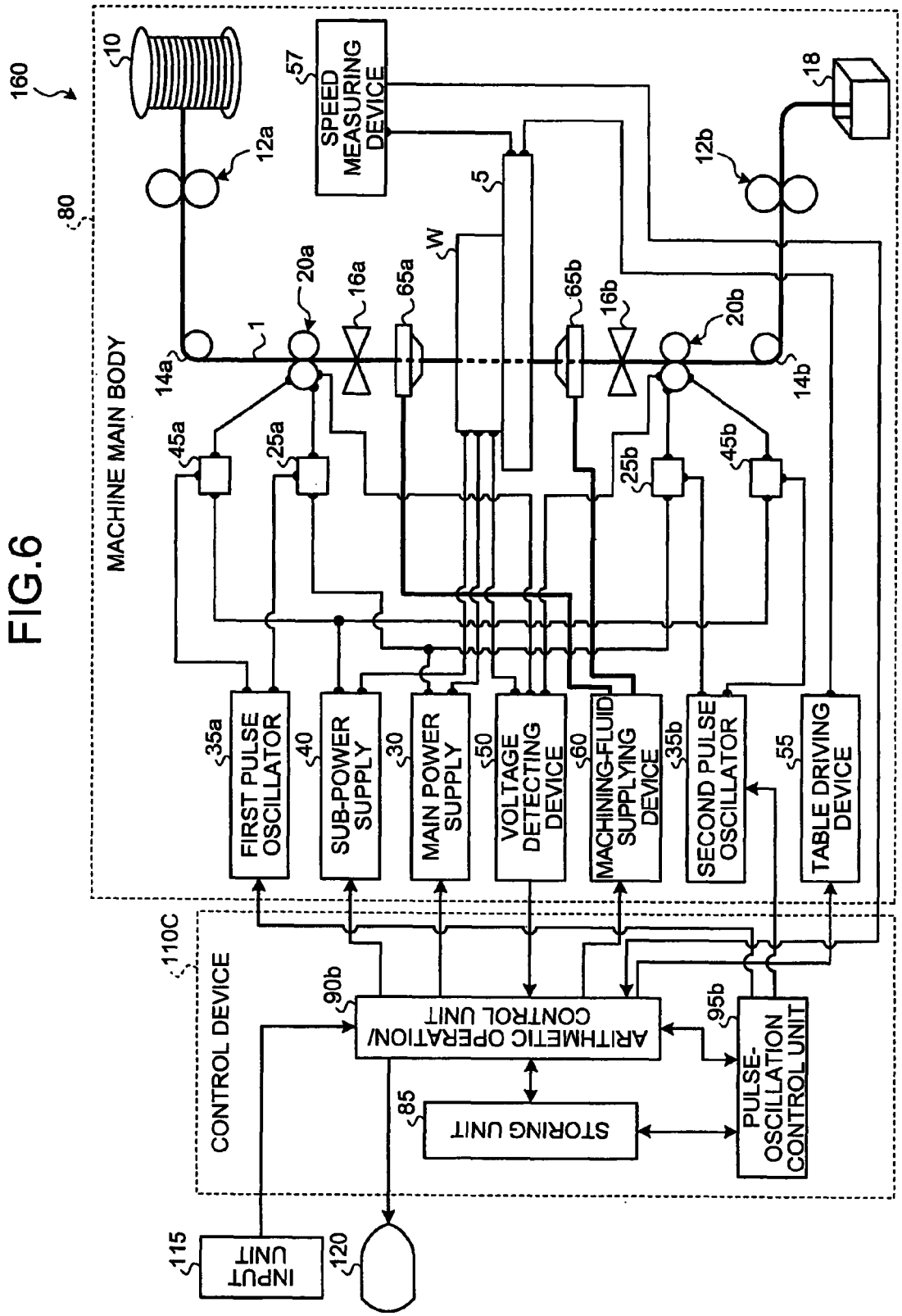
FIG. 6 is a schematic diagram of another example of the wire-discharge machining apparatus according to the present invention that can prevent wire-breakage due to deviation of impedances between power supplying circuits.
Figure 7:
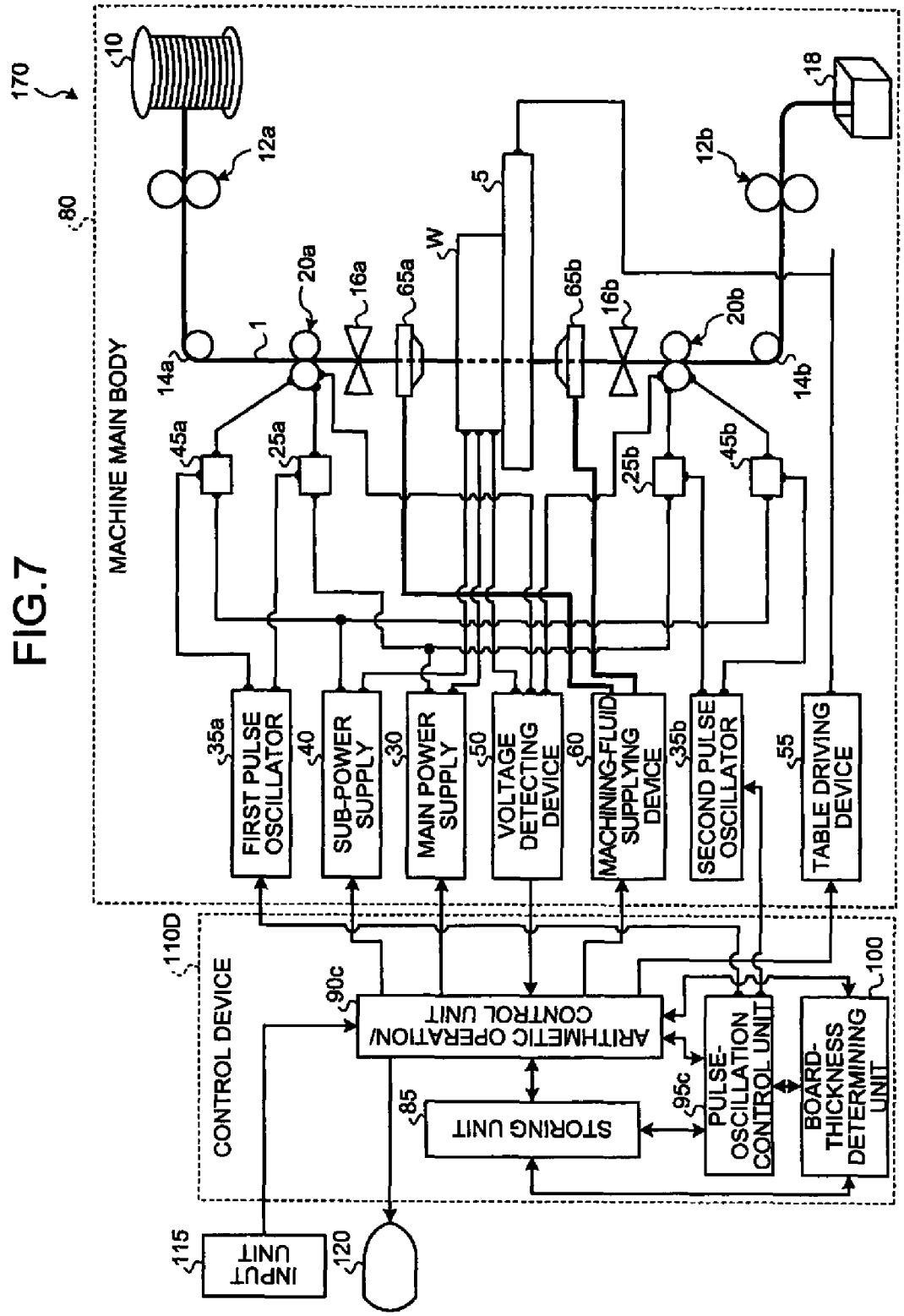
FIG. 7 is a schematic diagram of still another example of the wire-discharge machining apparatus according to the present invention that can prevent wire-breakage due to deviation of impedances between power supplying circuits.

FIGS. 5 to 7 are schematic diagrams of an example of a wire-discharge machining apparatus that can prevent wire-breakage due to deviation of impedance between power supplying circuits. Components shown in these figures same as the components shown in FIG. 1 are denoted by reference numerals and signs same as the reference numerals and signs used in FIG. 1 and explanations of the components are omitted.

A wire-discharge machining apparatus 150 shown in FIG. 5 includes a control device 110B having a pulse-oscillation control unit 95a. The pulse-oscillation control unit 95a reads out data of a Z axis height (the height of the upper-side power supplying unit 20a with respect to the lower-side power supplying unit 20b) stored in the storing unit 85 in advance by a user or calculates a Z axis height from numerical control data stored in the storing unit 85 and compares this Z axis height with a reference value to calculate a magnitude relation between impedances in an upper-side power supplying circuit and a lower-side power supplying circuit. The pulse-oscillation control unit 95a modifies the power supply control data read out from the storing unit 85 according to, for example, an arithmetic operation to bring a discharge current value in a power supplying circuit having small impedance closer to a discharge current value in a power supplying circuit having large impedance. The pulse-oscillation control unit 95a controls operations of each of the first pulse oscillator 35a and the second pulse oscillator 35b based on the power supply control data modified.

For example, it is possible to adjust the discharge current value by changing a pulse length or a pulse interval in a high-frequency pulse voltage or changing a number of pulses supplied to adjust energy of the high-frequency pulse voltage supplied to the wire electrode 1. When the first switching element unit 25a and the second switching element unit 25b have plural switching elements, respectively, it is also possible to adjust the energy of the high-frequency pulse voltage supplied to the wire electrode 1 by changing the number of switching elements to be opened. As the reference value, a Z axis height assumed at the creation of the power supply control data is used. The reference value is stored in, for example, the storing unit 85 in advance. The wire-discharge machining apparatus 150 is particularly suitable when a flat object is used as the workpiece W.

A wire-discharge machining apparatus 160 shown in FIG. 6 includes a control device 110C having an arithmetic operation/control unit 90b and a pulse-oscillation control unit 95b. Like the arithmetic operation/control unit 90 shown in FIG. 1, the arithmetic operation/control unit 90b has a function of sequentially calculating a board thickness of the workpiece W using energy of a high-frequency pulse voltage applied from the wire electrode 1 to the workpiece W, machining speed, and the like. The arithmetic operation/control unit 90 sends a result of the calculation to the pulse-oscillation control unit 95b. In FIG. 6, a speed measuring device 57 not shown in FIG. 1 is shown.

The pulse-oscillation control unit 95b compares the calculation result sent from the arithmetic operation/control unit 90b with a reference value to calculate a magnitude relation between impedances in the upper-side power supplying circuit and the lower-side power supplying circuit. The pulse-oscillation control unit 95b modifies the power supply control data read out from the storing unit 85 according to, for example, an arithmetic operation to bring a discharge current value in a power supplying circuit having small impedance closer to a discharge current value in a power supplying circuit having large impedance. The pulse-oscillation control unit 95b controls operations of each of the first pulse oscillator 35a and the second pulse oscillator 35b based on the power supply control data modified. As the reference value, a board thickness assumed at the creation of the power supply control data is used. The reference value is stored in, for example, the storing unit 85 in advance. The wire-discharge machining apparatus 160 is suitable not only when a flat object is used as the workpiece W but also when a recess or a hole is formed in the workpiece W in advance.

A wire-discharge machining apparatus 170 shown in FIG. 7 includes a control device 110D having an arithmetic operation/control unit 90c, a pulse-oscillation control unit 95c, and a board-thickness determining unit 100. Three-dimensional data of a workpiece is stored in the storing unit 85. The arithmetic operation/control unit 90c controls operations of the board-thickness determining unit 100. The board-thickness determining unit 100 specifies an electric discharge machining point and calculates a board thickness of the workpiece W in the electric discharge machining point based on the three-dimensional data and numerical control data (numerical control data for the table driving device 55) stored in the storing unit 85. The board-thickness determining unit 100 sends data of the board thickness to the pulse-oscillation control unit 95c. The pulse-oscillation control unit 95c compares the data of the board thickness sent from the arithmetic operation/control unit 90c with a reference value to calculate a magnitude relation between impedances in the upper-side power supplying circuit and the lower-side power supplying circuit. The pulse-oscillation control unit 95c modifies the power supply control data read out from the storing unit 85 according to, for example, an arithmetic operation to bring a discharge current value in a power supplying circuit having small impedance closer to a discharge current value in a power supplying circuit having large impedance. The pulse-oscillation control unit 95c controls operations of each of the first pulse oscillator 35a and the second pulse oscillator 35b based on the power supply control data modified. As the reference value, a board thickness assumed at the creation of the power supply control data is used. The reference value is stored in, for example, the storing unit 85 in advance. The wire-discharge machining apparatus 170 is suitable not only when a flat object is used as the workpiece W but also when a recess or a hole is formed in the workpiece W in advance.

In the respective wire-discharge machining apparatuses 150, 160, and 170, conditions for supplying a high-frequency pulse voltage to the upper-side power supplying circuit and the lower-side power supplying circuit are adjusted according to a magnitude relation (deviation) of impedances between the power supplying circuits. Thus, it is easy to prevent wire-breakage due to the deviation of impedances between the power supplying circuits. Therefore, according to these wire-discharge machining apparatuses 150, 160, and 170, it is possible to prevent a short circuit between the wire electrode 1 and the workpiece W by mixing the upper-side power supply state, the lower-side power supply state, and the both-sides power supply state in the predetermined pattern as in the wire-discharge machining apparatus 130 shown in FIG. 1. Further, and it is easy to control wire-breakage compared with the wire-discharge machining apparatus 130. As a result, it is easy to improve productivity compared with the wire-discharge machining apparatus 130.

Fourth Embodiment

In the wire-discharge machining apparatus according to the present invention, it is possible to adjust conditions for supplying a high-frequency pulse voltage to the respective power supplying circuits according to impedance of the upper-side power supplying circuit and impedance of the lower-side power supplying circuit to prevent wire-breakage due to deviation of impedances between the power supplying circuits.

Figure 8:
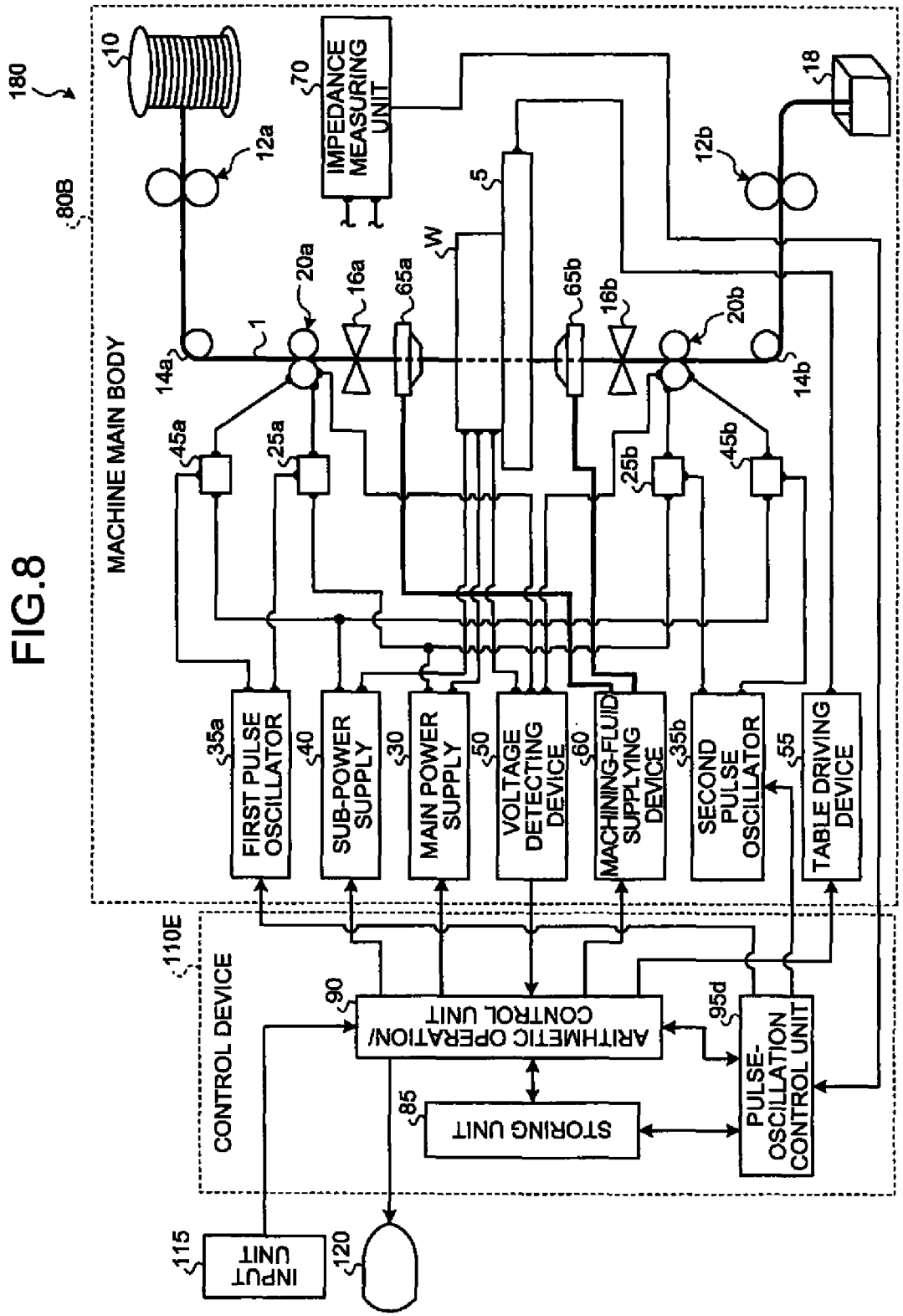
FIG. 8 is a schematic diagram of an example of a wire-discharge machining apparatus according to the present invention that is capable of adjusting conditions for supplying a high-frequency pulse voltage to upper and lower-side power supplying circuits according to impedance of each of the power supplying circuits.
Figure 9:
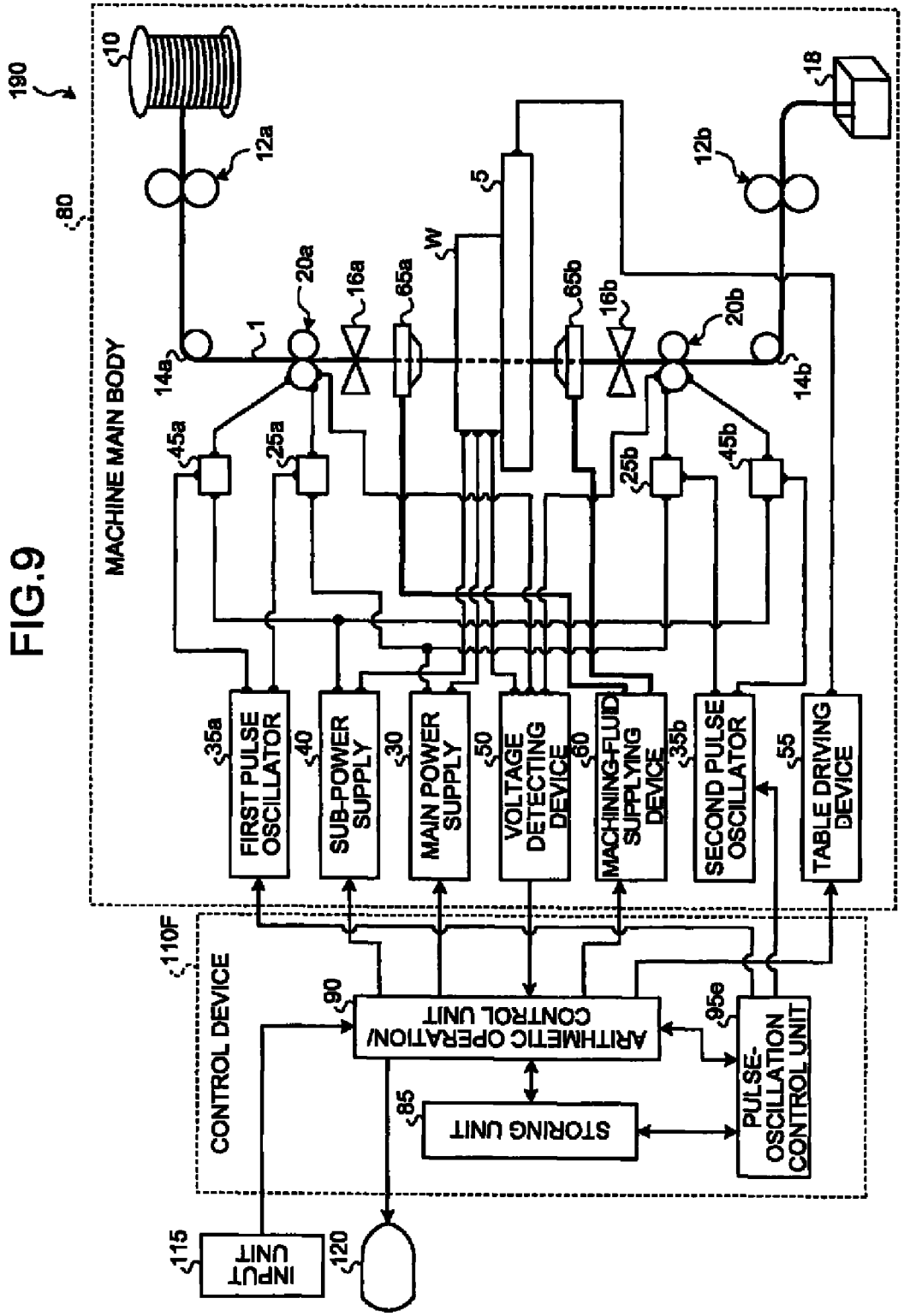
FIG. 9 is a schematic diagram of another example of the wire-discharge machining apparatus according to the present invention that is capable of adjusting conditions of supply of a high-frequency pulse voltage to upper and lower-side power supplying circuits according to impedance of each of the power supplying circuits.

FIGS. 8 and 9 are schematic diagrams of wire-discharge machining apparatuses that can adjust conditions for supplying a high-frequency pulse voltage to the upper-side power supplying circuit and the lower-side power supplying circuit according to impedance of the upper-side power supplying circuit and impedance of the lower-side power supplying circuit. Components shown in these figures same as the components shown in FIG. 1 are denoted by reference numerals and signs same as the reference numerals and signs used in FIG. 1 and explanations of the components are omitted.

A wire-discharge machining apparatus 180 shown in FIG. 8 includes a machine main body 80B having an impedance measuring unit 70 and a control device 110E having a pulse-oscillation control unit 95d. The impedance measuring unit 70 measures impedance between the main power supply 30 and the upper-side power supplying unit 20a in the upper-side power supplying circuit and impedance between the main power supply 30 and the lower-side power supplying unit 20b in the lower-side power supplying circuit, respectively. The impedance measuring unit 70 conveys a result of the measurement to the pulse-oscillation control unit 95d. The pulse-oscillation control unit 95d compares the result of the measurement by the impedance measuring unit 70 with a reference value to calculate a magnitude relation between the impedances in the upper-side power supplying circuit and the lower-side power supplying circuit. The pulse-oscillation control unit 95d modifies the power supply control data read out from the storing unit 85 according to, for example, an arithmetic operation to bring a discharge current value in a power supplying circuit having small impedance closer to a discharge current value in a power supplying circuit having large impedance. The pulse-oscillation control unit 95d controls operations of each of the first pulse oscillator 35a and the second pulse oscillator 35b based on the power supply control data modified. As the reference value, impedance assumed at the creation of the power supply control data is used. The reference value is stored in, for example, the storing unit 85 in advance.

A wire-discharge machining apparatus 190 shown in FIG. 9 includes a control device 110F having a pulse-oscillation control unit 95e. Impedances of the upper-side power supplying circuit and the lower-side power supplying circuit measured by a manufacturer or a user of the wire-discharge machining apparatus 190 are stored in the storing unit 85 in advance. Specifically, measured data of impedance between the main power supply 30 and the upper-side power supplying unit 20a in the upper-side power supplying circuit and measured data of impedance between the main power supply 30 and the lower-side power supplying unit 20b in the lower-side power supplying circuit are stored in the storing unit 85 in advance. The pulse-oscillation control unit 95e directly compares the measured data of the respective impedances stored in the storing unit 85 or compares the measured data with a reference value to calculate a magnitude relation between the impedances in the upper-side power supplying circuit and the lower-side power supplying circuit. The pulse-oscillation control unit 95e modifies the power supply control data read out from the storing unit 85 according to, for example, an arithmetic operation to bring a discharge current value in a power supplying circuit having small impedance closer to a discharge current value in a power supplying circuit having large impedance. The pulse-oscillation control unit 95e controls operations of each of the first pulse oscillator 35a and the second pulse oscillator 35b based on the power supply control data modified. As the reference value, impedance assumed at the creation of the power supply control data is used. The reference value is stored in, for example, the storing unit 85 in advance.

In the respective wire-discharge machining apparatuses 180 and 190 described above, conditions for supplying a high-frequency pulse voltage to the upper-side power supplying circuit and the lower-side power supplying circuit are adjusted according to impedance of the upper-side power supplying circuit itself and impedance of the lower-side power supplying circuit. Thus, it is easy to prevent wire-breakage due to deviation (a magnitude relation) of impedances between the power supplying circuits. Therefore, these wire-discharge machining apparatuses 180 and 190 realize technical effects same as those of the respective wire-discharge machining apparatuses 150, 160, and 170 explained in the third embodiment.

Fifth Embodiment

A wire-breakage preventing function of controlling operations of each of the first pulse oscillator and the second pulse oscillator to prevent wire-breakage when a sign of wire-breakage (hereinafter, "wire-breakage sign") is detected can be added to the wire-discharge machining apparatus according to the present invention.

Figure 10:
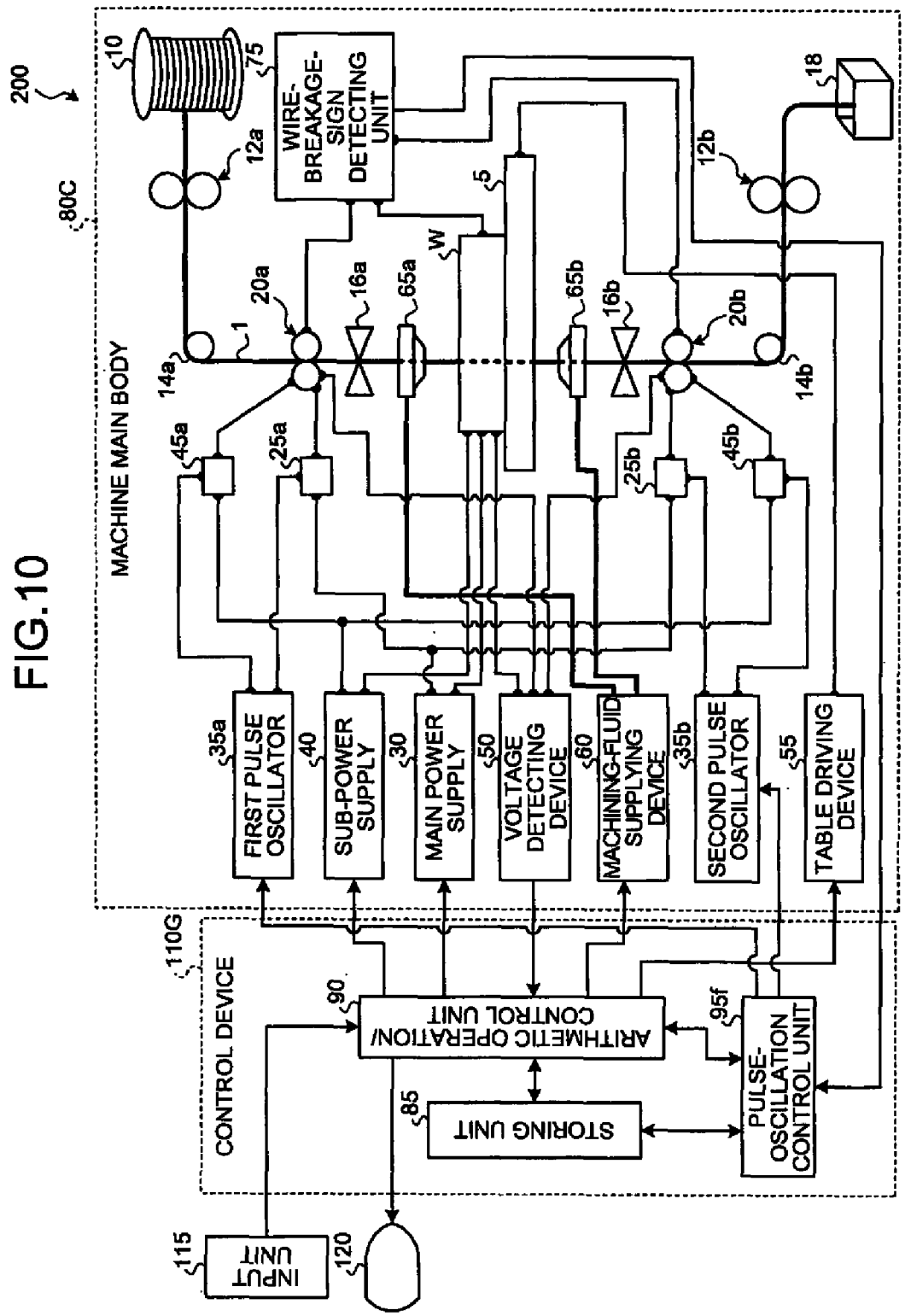
FIG. 10 is a schematic diagram of an example of a wire-discharge machining apparatus according to the present invention added with a wire-breakage preventing function.

FIG. 10 is a schematic diagram of an example of a wire-discharge machining apparatus added with the wire-breakage preventing function. A wire-discharge machining apparatus 200 shown in the figure includes a machine main body 80C having a wire-breakage-sign detecting unit 75 and a control device 110G having a pulse-oscillation control unit 95f. In the storing unit 85, in addition to the power supply control data explained in the first to the fourth embodiments (hereinafter referred to as "basic power supply control data" in this embodiment), power supply control data for preventing wire-breakage when there is a wire-breakage sign (hereinafter, "power supply control data for wire-breakage prevention") is further stored. Components shown in FIG. 10 same as the components shown in FIG. 1 are denoted by reference numerals and signs same as the reference numerals and signs used in FIG. 1 and explanations of the components are omitted.

The wire-breakage-sign detecting unit 75 is electrically connected to the upper-side power supplying unit 20a, the lower-side power supplying unit 20b, and the workpiece W. The wire-breakage-sign detecting unit 75 calculates, for example, positions of electric discharge points from a split ratio of electric currents in the upper-side power supplying circuit and the lower-side power supplying circuit. When concentrated electric discharge in which the electric discharge points are concentrated in one place is detected, the wire-breakage-sign detecting unit 75 judges that there is a sign of wire-breakage and sends a predetermined signal (hereinafter, "wire-breakage sign detection signal") to the pulse-oscillation control unit 95f.

The pulse-oscillation control unit 95f having received the wire-breakage sign detection signal modifies the power supply control data by reading out the power supply control data for wire-breakage prevention from the storing unit 85 and controls operations of each of the first pulse oscillator 35a and the second pulse oscillator 35b based on this power supply control data for wire-breakage prevention to prevent wire-breakage. For example, the pulse-oscillation control unit 95f controls operations of each of the first pulse oscillator 35a and the second pulse oscillator 35b such that the upper-side power supply state and the lower-side power supply state alternately appear. Consequently, the pulse-oscillation control unit 95f disperses the positions of the electric discharge points over time and prevents wire-breakage.

Since the wire-discharge machining apparatus 200 has the wire-breakage preventing function, it is easy to prevent wire-breakage compared with the respective wire-discharge machining apparatuses explained in the first to the fourth embodiments. Therefore, according to the wire-discharge machining apparatus 200, it is possible to prevent a short circuit between the wire electrode 1 and the workpiece W by mixing the upper-side power supply state, the lower-side power supply state, and the both-sides power supply state in the predetermined pattern as in the wire-discharge machining apparatus 130 shown in FIG. 1. Further, it is easy to control wire-breakage compared with the wire-discharge machining apparatus 130. As a result, it is easy to improve productivity compared with the wire-discharge machining apparatus 130.

When the wire-breakage preventing function is added to the wire-discharge machining apparatus, a function of resetting a power supply ratio from a long term (about 1 to 2 seconds) point of view to a predetermined ratio, i.e., a power supply ratio of each of the upper-side power supply state, the lower-side power supply state, and the both-sides power supply state at the time when operations of each of the first pulse oscillator and the second pulse oscillator are controlled based on the basic power supply control data (hereinafter, "power supply-ratio resetting function") can be added to the pulse oscillation control unit.

Figure 11:
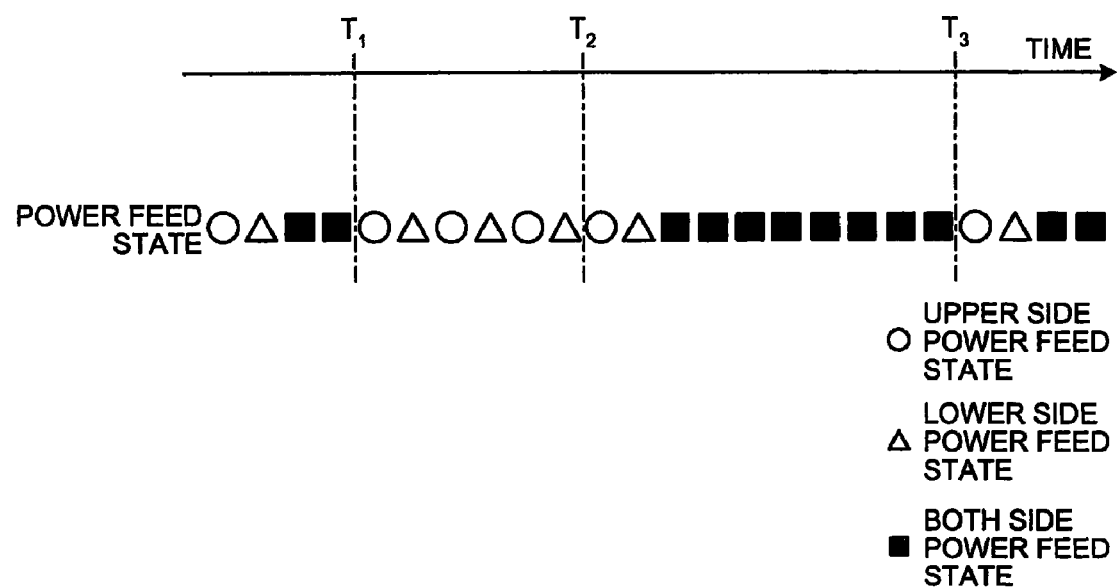
FIG. 11 is a schematic diagram for explaining an example of a power supply pattern at the time when a power supply-ratio resetting function is added to a pulse-oscillation control unit of the wire-discharge machining apparatus shown in FIG. 10.

FIG. 11 is a schematic diagram for explaining a power supply pattern at the time when the power supply-ratio resetting function is added to the pulse-oscillation control unit 95f. In the example shown in the figure, the pulse-oscillation control unit 95f controls operations of each of the first pulse oscillator 35a and the second pulse oscillator 35b based on the basic power supply control data until time $T_1$. Under the basic power supply control data, an operation for performing the upper-side power supply state and the lower-side power supply state for one period, respectively, and, then, performing the both wide power supply state for two periods is repeated.

When the wire-breakage sign detecting signal is sent from the wire-breakage-sign detecting unit 75 to the pulse-oscillation control unit 95f at time $T_1$, the pulse-oscillation control unit 95f starts to control the operations of each of the first pulse oscillator 35a and the second pulse oscillator 35b based on the power supply control data for wire-breakage prevention. The pulse-oscillation control unit 95f controls the operations of each of the first pulse oscillator 35a and the second pulse oscillator 35b such that the upper-side power supply state and the lower-side power supply state alternately appear. When the wire-breakage sign detection signal from the wire-breakage-sign detecting unit 75 stops at time $T_2$, the pulse-oscillation control unit 95f invokes the power supply-ratio resetting function and controls the operations of each of the first pulse oscillator 35a and the second pulse oscillator 35b to change the power supply ratio by each of the upper-side power supply state, the lower-side power supply state, and the both-sides power supply state to a power supply ratio under the basic power supply control data.

Specifically, since the both-sides power supply state is performed for no period between time $T_1$ and time $T_2$, the operations of each of the first pulse oscillator 35a and the second pulse oscillator 35b are controlled to set a ratio of the upper-side power supply state, the lower-side power supply state, and the both-sides power supply state to 1:1:2 and causes the upper-side power supply state and the lower-side power supply state to appear for one period, respectively, and causes the both-sides power supply state to appear for eight periods in a period from time $T_2$ to time $T_3$. Consequently, the power supply ratio by each of the upper-side power supply state, the lower-side power supply state, and the both-sides power supply state is returned to the power supply ratio under the basic power supply control data.

The power supply-ratio resetting function given to the pulse-oscillation control unit 95f includes a function of calculating a power supply ratio under the basic power supply control data, a function of counting the number of times of appearance of the upper-side power supply state, the lower-side power supply state, and the both-sides power supply state under the power supply control data for wire-breakage prevention, a function of calculating deviation of a power supply ratio caused by performing power supply under the power supply control data for wire-breakage prevention, i.e., deviation from the power supply ratio under the basic power supply control data, and a function of correcting the deviation. After time $T_3$, the pulse-oscillation control unit 95f controls the operations of each of the first pulse oscillator 35a and the second pulse oscillator 35b based on the basic power supply control data again.

Sixth Embodiment

A function of controlling operations of each of the first pulse oscillator and the second pulse oscillator to prevent a short circuit between the wire electrode and the workpiece when a sign of the short circuit or the short circuit is detected or to eliminate the short circuit (hereinafter, "short-circuit preventing function") can be added to the wire-discharge machining apparatus according to the present invention.

Figure 12:
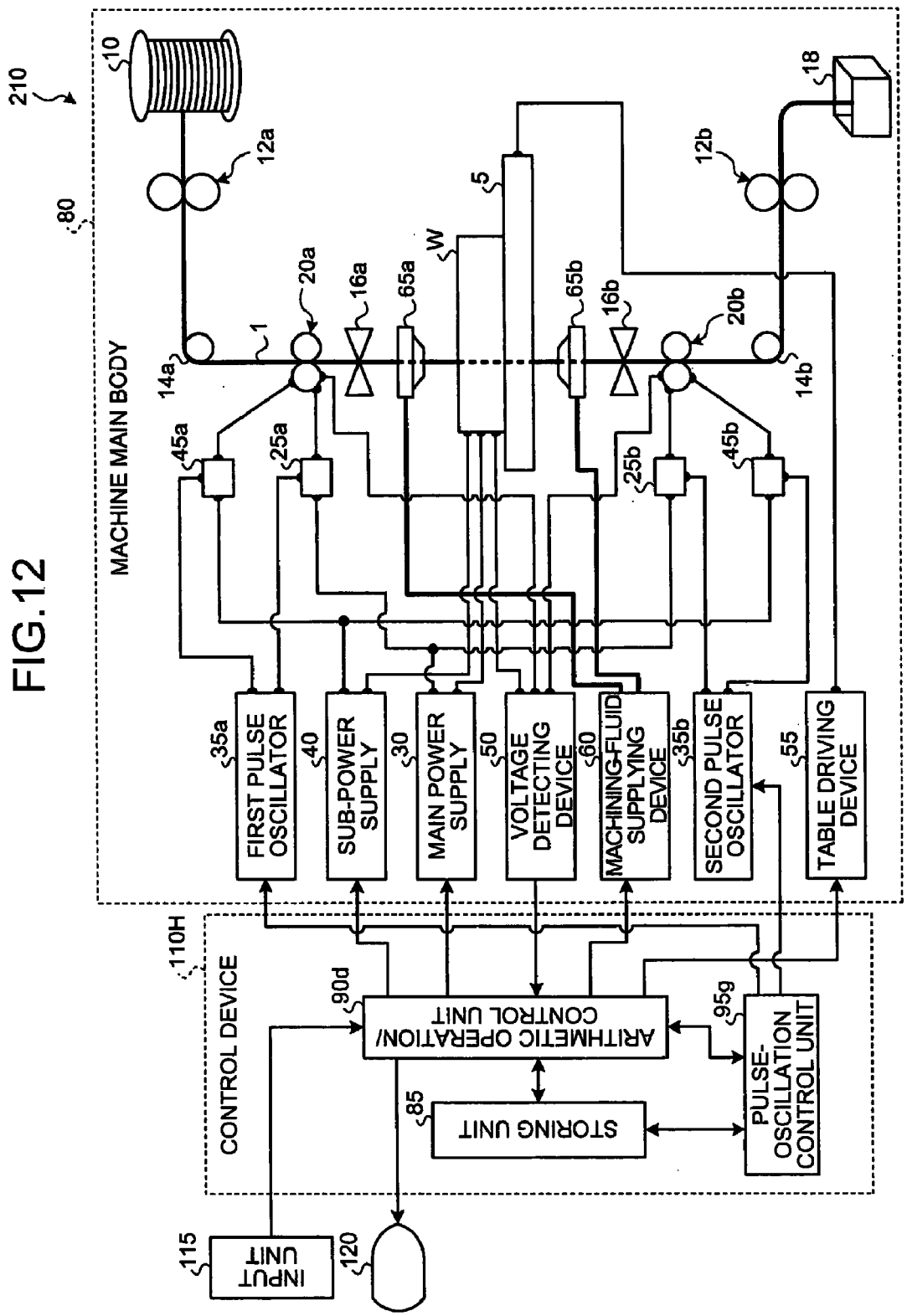
FIG. 12 is a schematic diagram of an example of a wire-discharge machining apparatus according to the present invention added with a short-circuit preventing function.

FIG. 12 is a schematic diagram of an example of a wire-discharge machining apparatus added with the short-circuit preventing function. A wire-discharge machining apparatus 210 shown in the figure includes a control device 110H including an arithmetic operation/control unit 90d and a pulse-oscillation control unit 95g. Power supply control data for preventing a short circuit when there is a sign of the short circuit or the short circuit or eliminating the short circuit (hereinafter, "power supply control data for short circuit prevention") is further stored in the storing unit 85. Components shown in FIG. 12 same as the components shown in FIG. 1 are denoted by reference numerals and signs same as the reference numerals and signs used in FIG. 1 and explanations of the components are omitted.

The arithmetic operation/control unit 90d detects a sign of a short circuit between the wire electrode 1 and the workpiece W or the short circuit based on potential differences between the respective power supplying units 20a and 20b and the workpiece W detected by the voltage detecting device 50. Specifically, the arithmetic operation/control unit 90 calculates a discharge voltage value from the potential differences between the respective power supplying units 20a and 20b and the workpiece W detected by the voltage detecting device 50 and, when this value falls below an average discharge voltage value set in advance based on a material of the wire electrode 1, a material of the workpiece W, a fluid quality of the machining fluid, a magnitude of a high-frequency pulse voltage applied to the wire electrode 1, and the like, judges that a sign of a short circuit or the short circuit has occurred. When the sign of a short circuit or the short circuit is detected, the arithmetic operation/control unit 90d sends a predetermined signal (hereinafter, "short circuit/sign detection signal") to the pulse-oscillation control unit 95g. The average discharge voltage value is calculated by a manufacturer or a user of the wire-discharge machining apparatus 210 and stored in the storing unit 85 in advance.

The pulse-oscillation control unit 95g having received the short circuit/sign detection signal from the arithmetic operation/control unit 90d modifies the power supply control data by reading out the power supply control data for short circuit prevention from the storing unit 85. The pulse-oscillation control unit 95g controls operations of each of the first pulse oscillator 35a and the second pulse oscillator 35b based on this power supply control data for short circuit prevention and prevents a short circuit between the wire electrode 1 and the workpiece W or eliminates the short circuit between the wire electrode 1 and the workpiece W. For example, the pulse-oscillation control unit 95g stabilizes an electric discharge between the wire electrode 1 and the workpiece W by controlling the operations of each of the first pulse oscillator 35a and the second pulse oscillator 35b such that power supply is performed in the both-sides power supply state. Consequently, the pulse-oscillation control unit 95g prevents a short circuit between the wire electrode 1 and the workpiece W or eliminates the short circuit between the wire electrode 1 and the workpiece W.

Since the wire-discharge machining apparatus 210 has the short-circuit preventing function, it is easy to prevent a short circuit between the wire electrode 1 and the workpiece W compared with the respective wire-discharge machining apparatuses explained in the first to the fifth embodiments. Therefore, according to the wire-discharge machining apparatus 210, it is possible to prevent a short circuit between the wire electrode 1 and the workpiece W by mixing the upper-side power supply state, the lower-side power supply state, and the both-sides power supply state in the predetermined pattern as in the wire-discharge machining apparatus 130 shown in FIG. 1. Further, it is easy to control the short circuit between the wire electrode 1 and the workpiece W compared with the wire-discharge machining apparatus 130. As a result, it is easy to improve productivity compared with the wire-discharge machining apparatus 130. When the short-circuit preventing function is added to the wire-discharge machining apparatus, it is also possible to add the power supply-ratio resetting function explained in the fifth embodiment to the pulse-oscillation control unit.

Seventh Embodiment

A function of controlling operations of each of the first pulse oscillator and the second pulse oscillator according to a flow rate of machining fluid supplied to each of the upper-side nozzle and the lower-side nozzle from the machining-fluid supplying device can be added to the wire-discharge machining apparatus according to the present invention.

Figure 13:
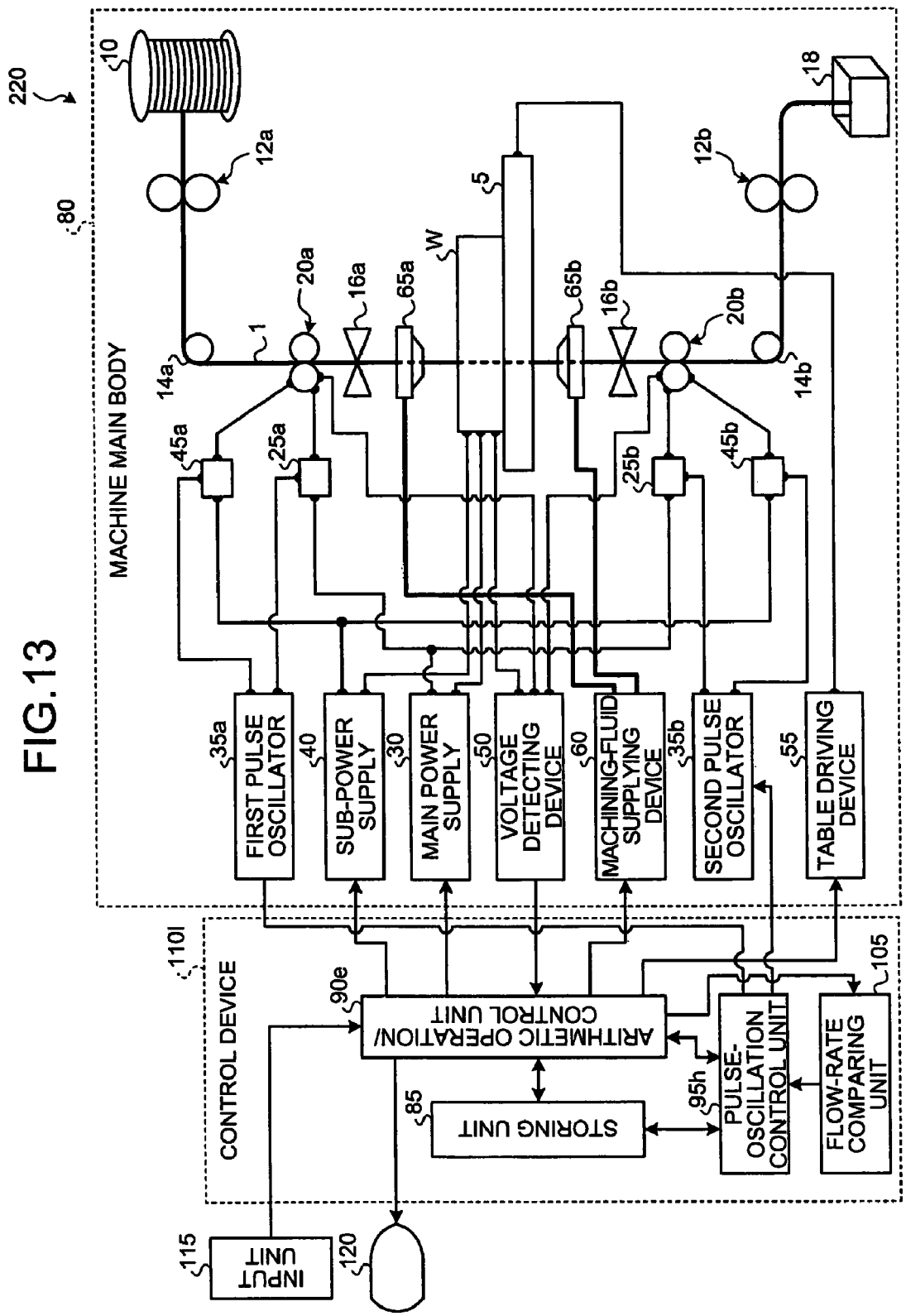
FIG. 13 is a schematic diagram of an example of a wire-discharge machining apparatus according to the present invention added with a function of controlling operations of a first pulse oscillator and a second pulse oscillator according to a flow rate of machining fluid supplied to each of an upper-side nozzle and a lower-side nozzle from machining fluid supply device.

FIG. 13 is a schematic diagram of an example of a wire-discharge machining apparatus added with the function. A wire-discharge machining apparatus 220 shown in the figure includes a control device 110I having an arithmetic operation/control unit 90e, a pulse-oscillation control unit 95h, and a flow-rate comparing unit 105. Components shown in FIG. 13 same as the components shown in FIG. 1 are denoted by reference numerals and signs same as the reference numerals and signs used in FIG. 1 and explanations of the components are omitted.

The arithmetic operation/control unit 90e sends to the flow-rate comparing unit 105 data concerning a flow rate of the machining fluid supplied to the upper-side nozzle 65a and a flow rate of the machining fluid supplied to the lower-side nozzle 65b from the machining-fluid supplying device 60 when an operation of the machining-fluid supplying device 60 is controlled based on the numerical control data (the numerical control data for the machining-fluid supplying device 60) stored in the storing unit 85. The flow-rate comparing unit 105 having received these data compares the respective data with a reference value and sends a result of the comparison to the pulse-oscillation control unit 95h. The flow-rate comparing unit 105 has, as the reference value, for example, data of a flow rate of the machining fluid assumed at the creation of the power supply control data.

The pulse-oscillation control unit 95h reads out the power supply control data from the storing unit 85 and controls the operations of each of the first pulse oscillator 35a and the second pulse oscillator 35b. On the other hand, when there is a nozzle having a flow rate of the machining fluid judged as exceeding the reference value from a result of comparison by the flow-rate comparing unit 105, the pulse-oscillation control unit 95h modifies the power supply control data according to, for example, an arithmetic operation. In other words, the pulse-oscillation control unit 95h modifies the power supply control data to reduce a power supply ratio of a high-frequency pulse voltage supplied to the wire electrode 1 from the upper-side power supplying unit 20a or the lower-side power supplying unit 20b on a side same as the nozzle having a flow rate of the machining fluid judged as exceeding the reference value. The pulse-oscillation control unit 95h controls the operations of each of the first pulse oscillator 35a and the second pulse oscillator 35b based on the power supply control data modified.

When the workpiece is wire-discharge machined, a flow rate of the machining fluid supplied to each of the upper-side nozzle and the lower-side nozzle from the machining fluid supplying device is not always fixed in all steps of the electric discharge machining. For example, a flow rate of the machining fluid is different in a linear section and an arcuate section of a relative moving path of the wire electrode. A flow rate of the machining fluid may be different in the upper-side nozzle 65a and the lower-side nozzle 65b. When a flow rate of the machining fluid is different in the upper-side nozzle 65a and the lower-side nozzle 65b, a fluid quantity of the machining fluid flowing from a nozzle having a larger flow rate of the machining fluid into a machining groove (a gap between the wire electrode 1 and the workpiece W) is smaller than a fluid quantity of the machining fluid flowing from a nozzle having a smaller flow rate of the machining fluid into the machining groove. Machining wastes and the like tend to accumulate in the machining groove on the side of the nozzle having the larger flow rate of the machining fluid. As a result, an electric discharge frequency rises and wire-breakage tends to occur on the side of the nozzle having the larger flow rate of the machining fluid.

In the wire-discharge machining apparatus 220 shown in FIG. 13, when there is a nozzle having a flow rate of the machining fluid judged as exceeding the reference value, the operations of each of the first pulse oscillator 35a and the second pulse oscillator 35b are controlled to reduce a power supply ratio of a high-frequency pulse voltage supplied to the wire electrode 1 from the power supplying unit on the same side as the nozzle. Thus, even when a flow rate of the machining fluid supplied to each of the upper-side nozzle 65a and the lower-side nozzle 65b fluctuates, wire-breakage is controlled.

Therefore, according to the wire-discharge machining apparatus 220, it is possible to prevent a short circuit between the wire electrode 1 and the workpiece W by mixing the upper-side power supply state, the lower-side power supply state, and the both-sides power supply state in the predetermined pattern as in the wire-discharge machining apparatus 130 shown in FIG. 1. Further, it is easy to control wire-breakage compared with the wire-discharge machining apparatus 130. As a result, it is easy to improve productivity compared with the wire-discharge machining apparatus 130.

The wire-discharge machining apparatus according to the present invention has been explained with the seven forms described above as the examples. However, the present invention is not limited to the seven forms described above. For example, to allow the user to easily store desired power supply control data in the storing unit, it is also possible to provide a data converting unit in the control device to store the desired power supply control data in the storing unit simply by inputting a mixing pattern (an appearance pattern) of the upper-side power supply state, the lower-side power supply state, and the both-sides power supply state from the input unit.

Figure 14:
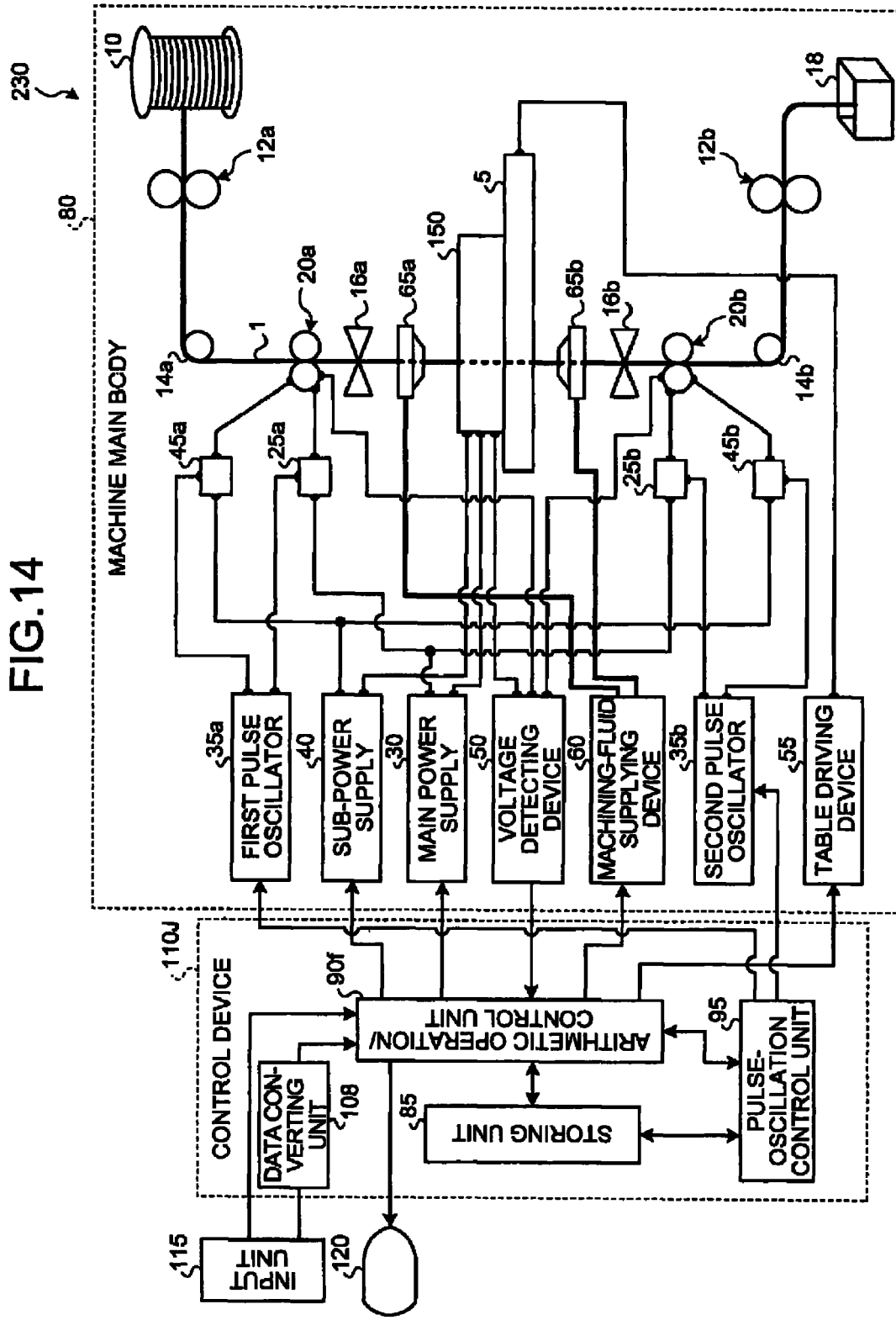
FIG. 14 is a schematic diagram of an example of a wire-discharge machining apparatus according to the present invention in which a data converting unit that converts appearance patterns of an upper-side power supply state, a lower-side power supply state, and a both-sides power supply state inputted from an input unit into power supply control data is provided in a control device.

FIG. 14 is a schematic diagram of an example of a wire-discharge machining apparatus in which the data converting unit is provided in the control device. A data converting unit 108 that creates, when a mixing pattern (an appearance pattern) of the upper-side power supply state, the lower-side power supply state, and the both-sides power supply state is inputted from the input unit, power supply control data corresponding to the appearance pattern is provided in a control device 110J of a wire-discharge machining apparatus 230 shown in the figure. The power supply control data created by the data converting unit 108 is stored in the storing unit 85 via the arithmetic operation/control unit 90. The pulse-oscillation control unit 95 controls operations of each of the first pulse oscillator 35a and the second pulse oscillators 35b based on the power supply control data. Components shown in FIG. 14 same as the components shown in FIG. 1 are denoted by reference numerals and signs same as the reference numerals and signs used in FIG. 1 and explanations of the components are omitted.

Although not shown in the figure, in the wire-discharge machining apparatus according to the present invention, the first switching element unit and the second switching element unit to which the main power supply is connected may be members separate from the main power supply or may be components of the main power supply. Similarly, the third switching element unit and the fourth switching element unit to which the sub power supply is connected may be members separate from the sub power supply or may be components of the sub power supply. The same holds true for each of the first pulse oscillator and the second pulse oscillator. The first pulse oscillator and the second pulse oscillator may be components of the main power supply or the sub power supply or may be components of the pulse-oscillation control.

Figure 15:
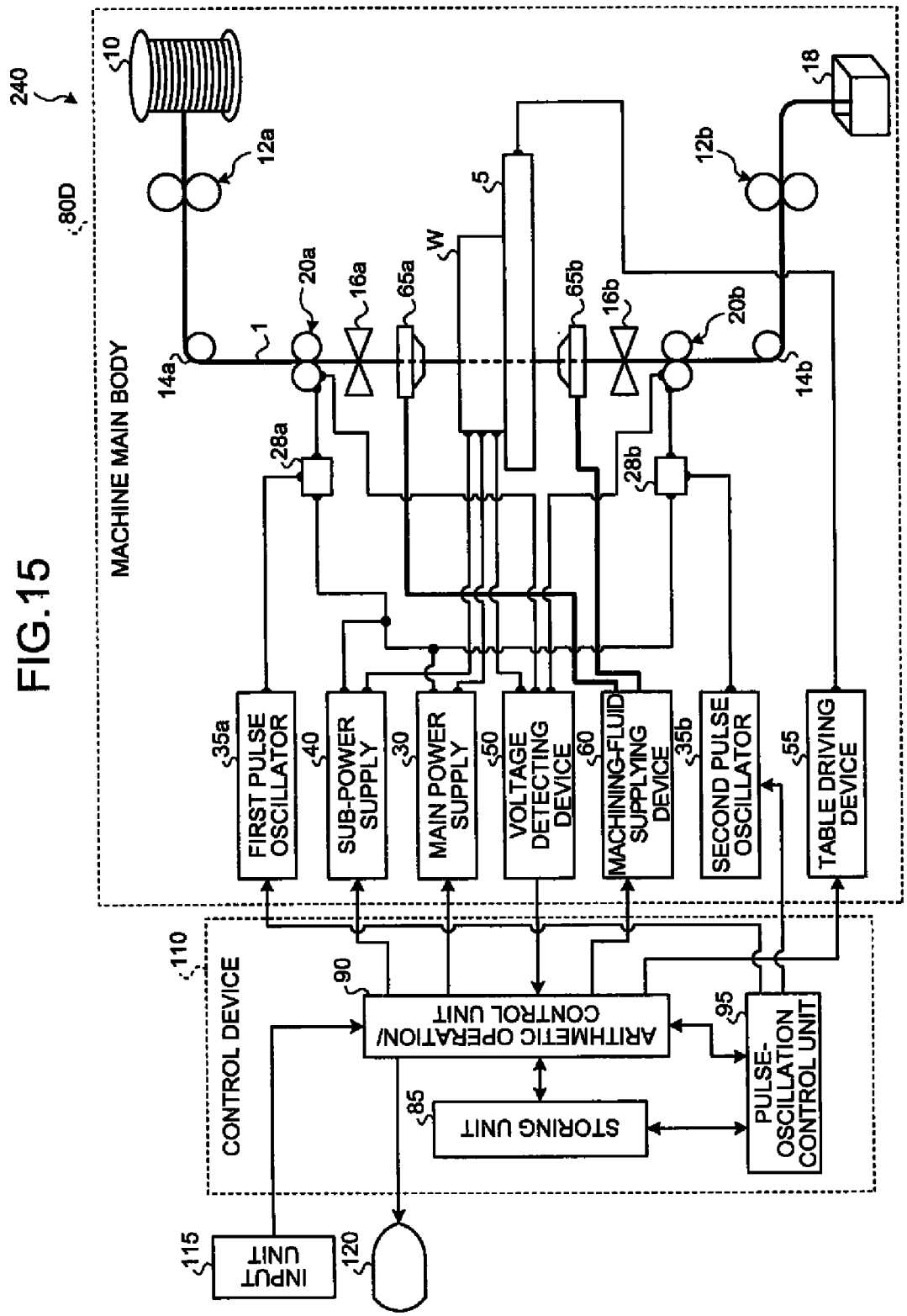
FIG. 15 is a schematic diagram of an example of a wire-discharge machining apparatus according to the present invention in which only one switching element unit is provided in one power supplying unit.

Moreover, it is also possible to provide only one switching element unit in one power supplying unit. FIG. 15 is a schematic diagram of an example of a wire-discharge machining apparatus in which only one switching element unit is provided in one power supplying unit. In a machine main body 80D of a wire-discharge machining apparatus 240 shown in the figure, one switching element unit 28a (hereinafter, "first switching element unit 28a") is provided in association with the upper-side power supplying unit 20a. No switching element unit is connected to the upper-side power supplying unit 20a except the first switching element unit 28a. Similarly, one switching element unit 28b (hereinafter, "second switching element unit 28b") is provided in association with the lower-side power supplying unit 20b. No switching element unit is connected to the lower-side power supplying unit 20b except the second switching element unit 28b. The respective switching element units 28a and 28b are shared by the main power supply 30 and the sub power supply 40. The first pulse oscillator 35a is connected to the first switching element unit 28a and the second pulse oscillator 35b is connected to the second switching element unit 28b.

The first switching element unit 28a may be a member separate from both the main power supply 30 and the sub power supply 40 or may be a component of the main power supply 30 or the sub power supply 40. Similarly, the second switching element unit 28b may be a member separate from both the main power supply 30 and the sub power supply 40 or may be a component of the main power supply 30 or the sub power supply 40.

Regardless of how many switching element units are provided in one power supplying unit, in the wire-discharge machining apparatus according to the present invention, it is possible to arbitrarily mix the upper-side power supply state, the lower-side power supply state, and the both-sides power supply state (cause the power supply states to appear) during a period of electric discharge machining. Thus, it is also possible to appropriately change an amount of electric discharge machining in the board thickness direction of the workpiece while preventing a short circuit between the wire electrode and the workpiece and wire-breakage and improve machining accuracy in the board thickness direction. If a power supply ratio in the upper-side power supply state is increased, it is possible to advance electric discharge machining in an upper part in the board thickness direction in the workpiece. If a power supply ratio in the lower-side power supply state is increased, it is possible to advance electric discharge machining in a lower part in the board thickness direction in the workpiece. Thus, it is possible to improve machining accuracy in the board thickness direction of the workpiece by appropriately combining these power supply states.

It is possible to calculate a board thickness of the workpiece in an electric discharge machining point using three-dimensional data of the workpiece as in the wire-discharge machining apparatus 170 shown in FIG. 7. Thus, in the wire-discharge machining apparatus having the function of calculating a board thickness of the workpiece in the electric discharge machining point using the three-dimensional data, it is also possible to omit the function of calculating a board thickness of the workpiece from energy of a high-frequency pulse voltage applied to the workpiece from the wire electrode, machining speed, and the like. Concerning the wire-discharge machining apparatus according to the present invention, various alterations, modifications, combinations, and the like are possible other than those described above.

The invention claimed is:

1. A wire-discharge machining apparatus that applies, while supplying machining fluid to a space between a wire electrode traveling in a board thickness direction of a workpiece and the workpiece, a high-frequency pulse voltage to the wire electrode via a pair of power supplying units arranged above and below the workpiece and machines the workpiece with an electric discharge caused between the wire electrode and the workpiece, the wire-discharge machining apparatus comprising:
   a main power supply that applies the high-frequency pulse voltage to an upper-side power supplying unit of the pair of power supplying units arranged on an upper-side of the workpiece via a first switching element unit and applies the high-frequency pulse voltage to a lower-side power supplying unit arranged on a lower-side of the workpiece via a second switching element unit;
   a first pulse oscillator that supplies a pulse signal for controlling opening and closing operations of the first switching element unit to the first switching element unit;
   a second pulse oscillator that supplies a pulse signal for controlling opening and closing operations of the second switching element unit to the second switching element unit;
   a storing unit having stored therein power supply control data for defining the opening and closing operations of each of the first switching element unit and the second switching element unit and performing power supply control to mix an upper-side power supply state in which the high-frequency pulse voltage is applied to the wire electrode only from the upper-side power supplying unit, a lower-side power supply state in which the high-frequency pulse voltage is applied to the wire electrode only from the lower-side power supplying unit, and a both-sides power supply state in which the high-frequency pulse voltage is applied to the wire electrode from both the upper-side power supplying unit and the lower-side power supplying unit in synchronization with each other; and
   a pulse-oscillation control unit that controls operations of each of the first pulse oscillator and the second pulse oscillator based on the power supply control data,
   wherein the pulse-oscillation control unit modifies, according to impedance between the main power supply and the upper-side power supplying unit and impedance between the main power supply and the lower-side power supplying unit, the power supply control data to bring a discharge current value in a power supplying circuit having smaller impedance closer to a discharge current value in a power supplying circuit having larger impedance and controls the operations of each of the first pulse oscillator and the second pulse oscillator based on the modified power supply control data.

2. The wire-discharge machining apparatus according to claim 1, further comprising a wire-breakage-sign detecting unit that is connected to the upper-side power supplying unit, the lower-side power supplying unit, and the workpiece and detects a sign of wire-breakage, wherein
   the pulse-oscillation control unit modifies, when the wire-breakage-sign detecting unit detects a sign of wire-breakage, the power supply control data to disperse positions of electric discharges between the wire electrode and the workpiece over time and controls an operation of each of the first pulse oscillator and the second pulse oscillator based on the modified power supply control data.

3. The wire-discharge machining apparatus according to claim 1, wherein the pulse-oscillation control unit modifies, when the wire-breakage-sign detecting unit detects a sign of wire-breakage, the power supply control data such that the upper-side power supply state and the lower-side power supply state alternately appear.

4. The wire-discharge machining apparatus according to claim 1, wherein
data concerning a Z axis height assumed at creation of the power supply control data is further stored in the storing unit, and
the pulse-oscillation control unit judges a magnitude relation between the impedance in the upper-side power supplying circuit and the impedance in the lower-side power supplying circuit based on a Z axis height at the time when the workpiece is electric-discharge machined and the data concerning the Z axis height stored in the storing unit.

5. The wire-discharge machining apparatus according to claim 1, further comprising:
a table that can move in two axial directions in a state in which the workpiece is placed thereon;
a table driving device that moves the table in the two axial directions;
a speed measuring device that measures driving speed of the table;
a voltage detecting device that detects a potential difference between each of the upper-side power supplying unit and the lower-side power supplying unit and the workpiece; and
an arithmetic operation/control unit that calculates machining speed based on the driving speed of the table measured by the speed measuring device, calculates, based on the potential difference detected by the voltage detecting device, energy of the high-frequency pulse voltage applied to the workpiece from the wire electrode, and calculates a board thickness of the workpiece using the machining speed and the energy of the high-frequency pulse voltage, wherein
the pulse-oscillation control unit judges, based on the board thickness of the workpiece calculated by the arithmetic operation/control unit, a magnitude relation between the impedance in the upper-side power supplying circuit and the impedance in the lower-side power supplying circuit.

6. The wire-discharge machining apparatus according to claim 1, further comprising:
a table that can move in two axial directions in a state in which the workpiece is placed thereon;
a table driving device that moves the table in the two axial directions;
an arithmetic operation/control unit that controls an operation of the table driving device; and
a board-thickness determining unit that calculates a board thickness of the workpiece at a point electric-discharge machined, wherein
numerical control data for numerically controlling an operation of the table driving device and three-dimensional data of the workpiece are further stored in the storing unit,
the arithmetic operation/control unit controls the operation of the table driving device based on the numerical control data,
the board-thickness determining unit calculates, based on the numerical control data and the three-dimensional data, the board thickness of the workpiece at the point electric-discharge machined, and the pulse-oscillation control unit judges, based on the board thickness of the workpiece calculated by the board-thickness determining unit, a magnitude relation between the impedance in the upper-side power supplying circuit and the impedance in the lower-side power supplying circuit.

7. The wire-discharge machining apparatus according to claim 1, further comprising an impedance measuring unit that measures the impedance in the upper-side power supplying circuit and the impedance in the lower-side power supplying circuit, wherein
the pulse-oscillation control unit judges, based on a measurement result of the impedance measuring unit, a magnitude relation between the impedance in the upper-side power supplying circuit and the impedance in the lower-side power supplying circuit.

8. The wire-discharge machining apparatus according to claim 1, wherein
measured data of each of the impedance in the upper-side power supplying circuit and the impedance in the lower-side power supplying circuit is stored in the storing unit, and
the pulse-oscillation control unit judges, based on the measured data of each of the impedance in the upper-side power supplying circuit and the impedance in the lower-side power supplying circuit stored in the storing unit, a magnitude relation between the impedance in the upper-side power supplying circuit and the impedance in the lower-side power supplying circuit.

9. The wire-discharge machining apparatus according to claim 1, wherein the main power supply includes:
a first main power supply connected to the upper-side power supplying unit via the first switching element unit and connected to an upper part in the board thickness direction in the workpiece, and
a second main power supply connected to the lower-side power supplying unit via the second switching element unit and connected to a lower part in the board thickness direction in the workpiece.

10. A wire-discharge machining apparatus that applies, while supplying machining fluid to a space between a wire electrode traveling in a board thickness direction of a workpiece and the workpiece, a high-frequency pulse voltage to the wire electrode via a pair of power supplying units arranged above and below the workpiece and machines the workpiece with an electric discharge caused between the wire electrode and the workpiece, the wire-discharge machining apparatus comprising:
a main power supply that applies the high-frequency pulse voltage to an upper-side power supplying unit of the pair of power supplying units arranged on an upper-side of the workpiece via a first switching element unit and applies the high-frequency pulse voltage to a lower-side power supplying unit arranged on a lower-side of the workpiece via a second switching element unit;
a first pulse oscillator that supplies a pulse signal for controlling opening and closing operations of the first switching element unit to the first switching element unit;
a second pulse oscillator that supplies a pulse signal for controlling opening and closing operations of the second switching element unit to the second switching element unit;
a storing unit having stored therein power supply control data for defining the opening and closing operations of each of the first switching element unit and the second switching element unit and performing power supply control to mix an upper-side power supply state in which the high-frequency pulse voltage is applied to the wire electrode only from the upper-side power supplying unit, a lower-side power supply state in which the high-frequency pulse voltage is applied to the wire electrode only from the lower-side power supplying unit, and a both-sides power supply state in which the high-frequency pulse voltage is applied to the wire electrode from both the upper-side power supplying unit and the lower-side power supplying unit in synchronization with each other, a pulse-oscillation control unit that controls operations of each of the first pulse oscillator and the second pulse oscillator based on the power supply control data;

an upper-side nozzle arranged above the workpiece;

a lower-side nozzle arranged below the workpiece;

a machining-fluid supplying device that supplies the machining fluid to each of the upper-side nozzle and the lower-side nozzle;

an arithmetic operation/control unit that controls an operation of the machining-fluid supplying device and causes the machining-fluid supplying device to supply the machining fluid of a predetermined flow rate to each of the upper-side nozzle and the lower-side nozzle; and a flow-rate comparing unit that calculates a magnitude relation between a supply quantity of the machining fluid to each of the upper-side nozzle and the lower-side nozzle and a supply quantity of the machining fluid assumed at creation of the power supply control data, wherein:

numerical control data for numerically controlling an operation of the machining-fluid supplying device is further stored in the storing unit, the arithmetic operation/control unit controls the operation of the machining-fluid supplying device based on the numerical control data, and the pulse-oscillation control unit modifies, when there is a nozzle having a supply quantity of the machining fluid larger than the supply quantity of the machining fluid assumed at creation of the power supply control data as a result of the comparison by the flow-rate comparing unit, the power supply control data to reduce a power supply ratio from a power supplying unit on the same side as the nozzle to the wire electrode and controls the operation of each of the first pulse oscillator and the second pulse oscillator based on the modified power supply control data.

11. A wire-discharge machining apparatus that applies, while supplying machining fluid to a space between a wire electrode traveling in a board thickness direction of a workpiece and the workpiece, a high-frequency pulse voltage to the wire electrode via a pair of power supplying units arranged above and below the workpiece and machines the workpiece with an electric discharge caused between the wire electrode and the workpiece, the wire-discharge machining apparatus comprising:

a main power supply that applies the high-frequency pulse voltage to an upper-side power supplying unit of the pair of power supplying units arranged on an upper-side of the workpiece via a first switching element unit and applies the high-frequency pulse voltage to a lower-side power supplying unit arranged on a lower-side of the workpiece via a second switching element unit;

a first pulse oscillator that supplies a pulse signal for controlling opening and closing operations of the first switching element unit to the first switching element unit;

a second pulse oscillator that supplies a pulse signal for controlling opening and closing operations of the second switching element unit to the second switching element unit;

a storing unit having stored therein power supply control data for defining the opening and closing operations of each of the first switching element unit and the second switching element unit and performing power supply control to mix an upper-side power supply state in which the high-frequency pulse voltage is applied to the wire electrode only from the upper-side power supplying unit, a lower-side power supply state in which the high-frequency pulse voltage is applied to the wire electrode only from the lower-side power supplying unit, and a both-sides power supply state in which the high-frequency pulse voltage is applied to the wire electrode from both the upper-side power supplying unit and the lower-side power supplying unit in synchronization with each other;

a pulse-oscillation control unit that controls operations of each of the first pulse oscillator and the second pulse oscillator based on the power supply control data;

a voltage detecting device that detects a potential difference between each of the upper-side power supplying unit and the lower-side power supplying unit and the workpiece; and an arithmetic operation/control unit that judges, based on a result of the detection by the voltage detecting device, whether there is a short circuit between the wire electrode and the workpiece or a sign of the short circuit, wherein the pulse-oscillation control unit modifies, when the arithmetic operation/control unit judges that there is the short circuit or the sign of the short circuit, the power supply control data to stabilize an electric discharge between the wire electrode and the workpiece and controls an operation of each of the first pulse oscillator and the second pulse oscillator based on the modified power supply control data.

12. The wire-discharge machining apparatus according to claim 11, wherein the pulse-oscillation control unit modifies, when the arithmetic operation/control unit judges that there is the short circuit or the sign of the short circuit, the power supply control data to bring power supply into the both-sides power supply state.

* * * * *